(12) United States Patent
Shiokawa et al.

(10) Patent No.: US 11,506,766 B2
(45) Date of Patent: Nov. 22, 2022

(54) IMAGE-CAPTURING DEVICE, IMAGE-CAPTURING APPARATUS AND METHOD OF ACQUIRING DISTANCE IMAGE

(71) Applicant: MAXELL, LTD., Kyoto (JP)

(72) Inventors: Junji Shiokawa, Tokyo (JP); Takashi Matsubara, Tokyo (JP)

(73) Assignee: MAXELL, LTD., Kyoto (JP)

( * ) Notice: Subject to any disclaimer, the term of this patent is extended or adjusted under 35 U.S.C. 154(b) by 20 days.

(21) Appl. No.: 16/627,920

(22) PCT Filed: Jul. 27, 2017

(86) PCT No.: PCT/JP2017/027324
§ 371 (c)(1),
(2) Date: Dec. 31, 2019

(87) PCT Pub. No.: WO2019/021439
PCT Pub. Date: Jan. 31, 2019

(65) Prior Publication Data
US 2021/0149029 A1    May 20, 2021

(51) Int. Cl.
*G01S 7/486* (2020.01)
*G01S 17/10* (2020.01)
(Continued)

(52) U.S. Cl.
CPC ............ *G01S 7/4868* (2013.01); *G01S 17/10* (2013.01); *G01S 17/89* (2013.01); *H04N 5/2353* (2013.01);
(Continued)

(58) Field of Classification Search
None
See application file for complete search history.

(56) References Cited

U.S. PATENT DOCUMENTS 10,187,591 B2   1/2019   Matsuo et al.
10,687,002 B2   6/2020   Matsuo et al.
(Continued)

FOREIGN PATENT DOCUMENTS

JP   2008-008700 A   1/2008
JP   2008-268112 A   11/2008
(Continued)

OTHER PUBLICATIONS

Oct. 17, 2017 International Search Report issued in International Patent Application No. PCT/JP2017/027324.
(Continued)

*Primary Examiner* — Mohammad J Rahman
(74) *Attorney, Agent, or Firm* — Oliff PLC

(57) ABSTRACT

An image-capturing device includes a sensor, a visible-light-pixel driver, and a non-visible-light-pixel driver. The sensor is configured to have a plurality of visible light pixels having sensitivity to visible light and a plurality of non-visible light pixels having sensitivity to non-visible light. The visible-light-pixel driver controls light exposure to the visible light pixels and a reading operation for charges generated by photoelectric conversion of the visible light pixels resulting from the light exposure. The non-visible-light-pixel driver performs the light exposure to previously-set every two or more non-visible light pixels at the time of the light exposure to the non-visible light pixels and the reading operation, sums the charges generated by the photoelectric conversion of the two or more non-visible light pixels resulting from the light exposure, and creates the distance image on the basis of the summed charges.

19 Claims, 21 Drawing Sheets

(51) Int. Cl.
*G01S 17/89* (2020.01)
*H04N 5/235* (2006.01)
*H04N 9/04* (2006.01)
*H04N 9/07* (2006.01)

(52) U.S. Cl.
CPC ....... *H04N 5/2354* (2013.01); *H04N 9/04553* (2018.08); *H04N 9/07* (2013.01)

(56) References Cited

U.S. PATENT DOCUMENTS

| | | |
|---|---|---|
| 2008/0122933 A1 | 5/2008 | Murayama |
| 2008/0266431 A1 | 10/2008 | Ohyama et al. |
| 2012/0027180 A1* | 2/2012 | Tsuchiya ................. H04N 5/32 378/114 |
| 2012/0300904 A1* | 11/2012 | Shimada ................ A61B 6/542 378/62 |
| 2014/0140579 A1 | 5/2014 | Takemoto |
| 2014/0183337 A1* | 7/2014 | Hu ..................... H04N 5/37457 250/208.1 |
| 2014/0293107 A1* | 10/2014 | Nishihara .............. H04N 5/379 348/308 |
| 2015/0028102 A1* | 1/2015 | Ren .................... H04N 5/37213 235/454 |
| 2015/0124132 A1* | 5/2015 | Mabuchi ................ H04N 5/353 348/296 |
| 2015/0281618 A1* | 10/2015 | Saito ..................... G01S 17/894 348/303 |
| 2015/0285618 A1 | 10/2015 | Haraguchi |
| 2015/0365619 A1* | 12/2015 | Mayer .................... H04N 5/372 348/295 |
| 2016/0118424 A1* | 4/2016 | Guidash .............. H01L 27/1461 250/208.1 |
| 2016/0119594 A1 | 4/2016 | Asano et al. |
| 2017/0150077 A1* | 5/2017 | Matsuo .................. H04N 5/372 |
| 2018/0035068 A1* | 2/2018 | Morimoto ............ H04N 5/2329 |
| 2018/0191973 A1* | 7/2018 | Hirota ................ H04N 5/35563 |
| 2018/0249110 A1* | 8/2018 | Kobayashi ............. H04N 5/378 |
| 2018/0275255 A1* | 9/2018 | Yates ................... H04N 5/3745 |
| 2018/0372846 A1* | 12/2018 | Izuhara ................. G01S 17/894 |
| 2019/0174120 A1* | 6/2019 | Wang .................. H04N 5/3696 |
| 2019/0280030 A1* | 9/2019 | Kuwahara ............. G01S 17/10 |
| 2019/0312080 A1* | 10/2019 | Nozawa ............ H01L 27/14812 |

FOREIGN PATENT DOCUMENTS

| | | |
|---|---|---|
| JP | 2014-071520 A | 4/2014 |
| JP | 2014-106543 A | 6/2014 |
| JP | 2015-201733 A | 11/2015 |
| JP | 2016-114522 A | 6/2016 |
| WO | 2014/122714 A1 | 8/2014 |
| WO | 2015/011869 A1 | 1/2015 |

OTHER PUBLICATIONS

Oct. 12, 2021 Office Action issued in Japanese Patent Application No. 2020-200796.

* cited by examiner

| R | IR | R | G | R | IR | R | G |
|---|----|---|---|---|----|---|---|
| G | B | G | B | G | B | G | B |
| R | G | R | G | R | G | R | G |
| G | B | G | B | G | B | G | B |
| R | IR | R | G | R | IR | R | G |
| G | B | G | B | G | B | G | B |
| R | G | R | G | R | G | R | G |
| G | B | G | B | G | B | G | B |

(b)

| R | G | R | G | R | G | R | G |
|---|---|---|---|---|---|---|---|
| IR | B | G | B | IR | B | G | B |
| R | G | R | G | R | G | R | G |
| G | B | G | B | G | B | G | B |
| R | G | R | G | R | G | R | G |
| IR | B | G | B | IR | B | G | B |
| R | G | R | G | R | G | R | G |
| G | B | G | B | G | B | G | B |

FIG. 11
(a)
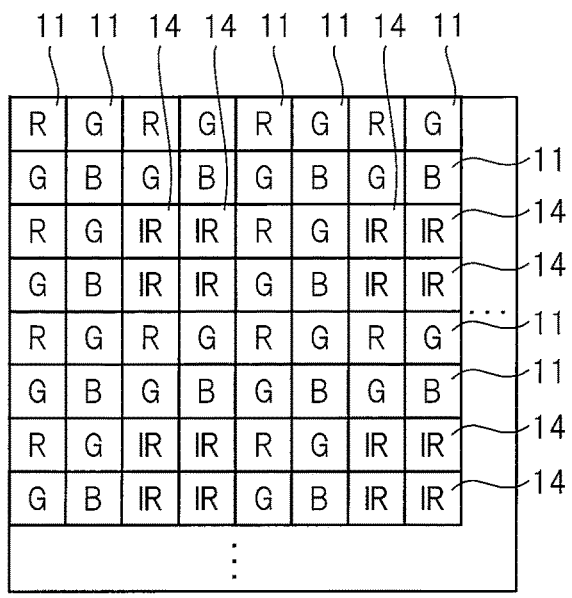
(b)
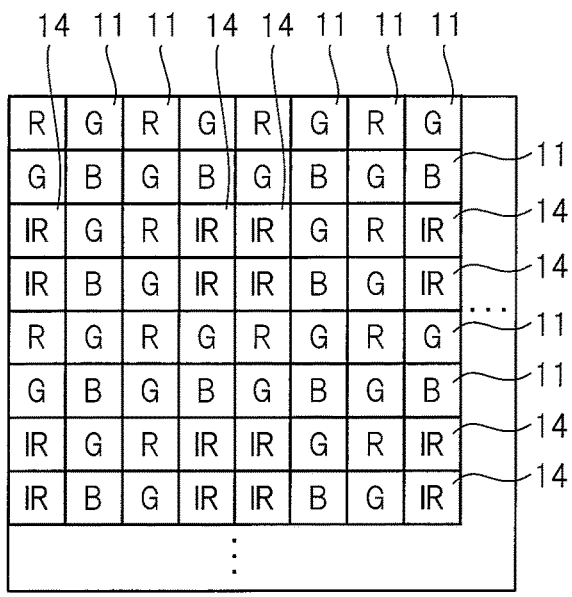
(c)
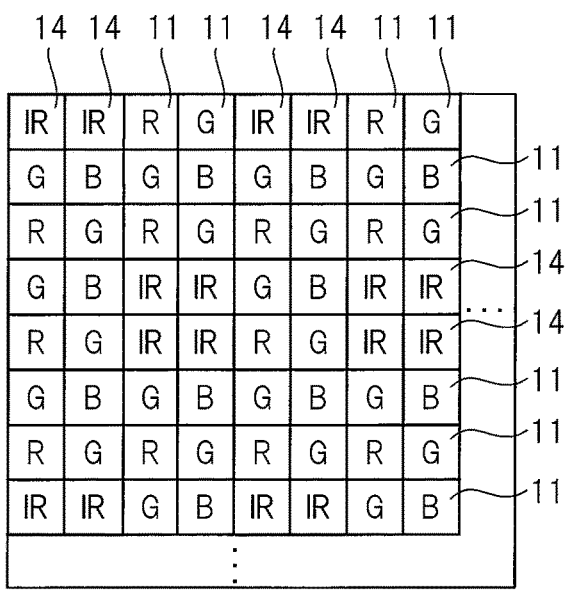
(d)
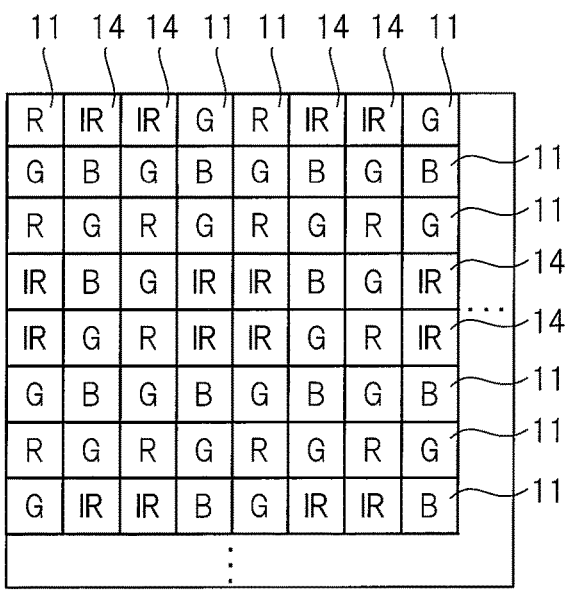

FIG. 16
(a)
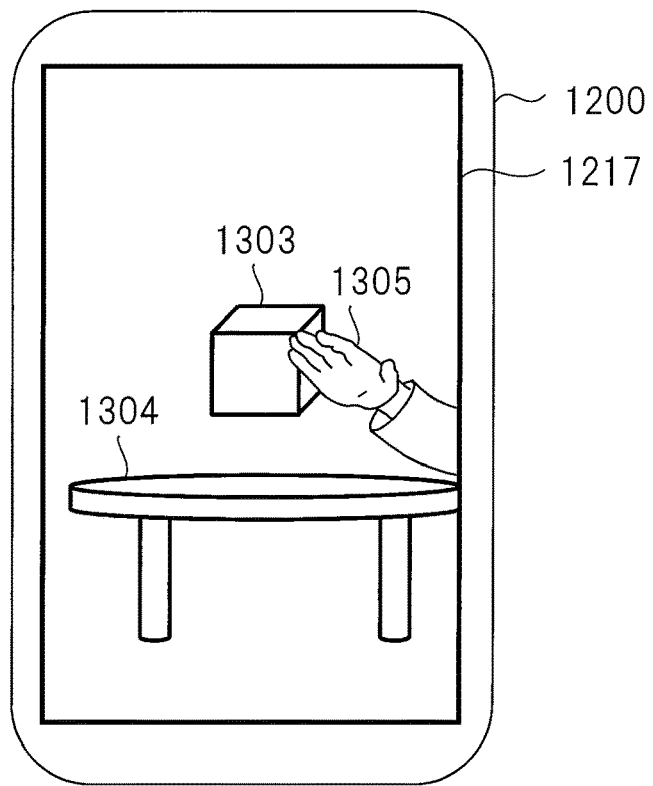
(b)
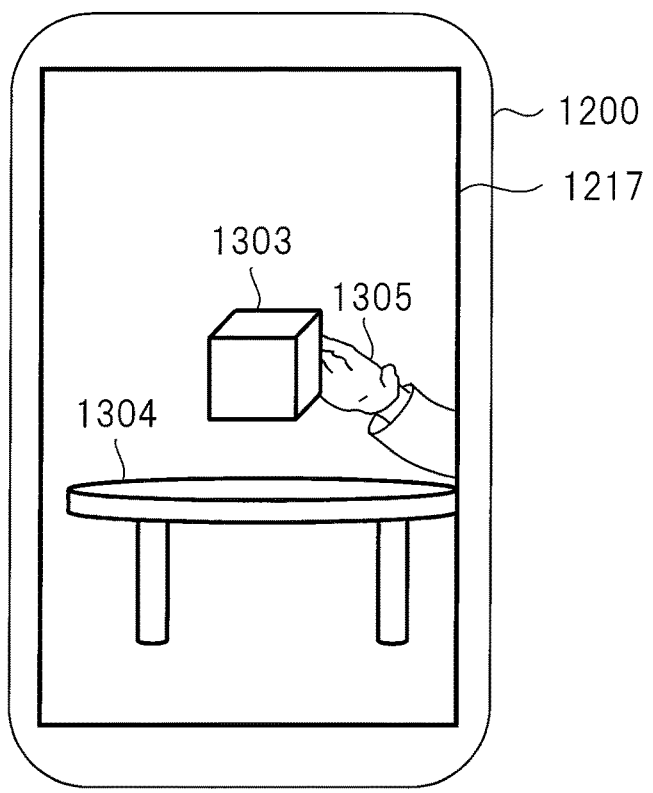

FIG. 17
(a)
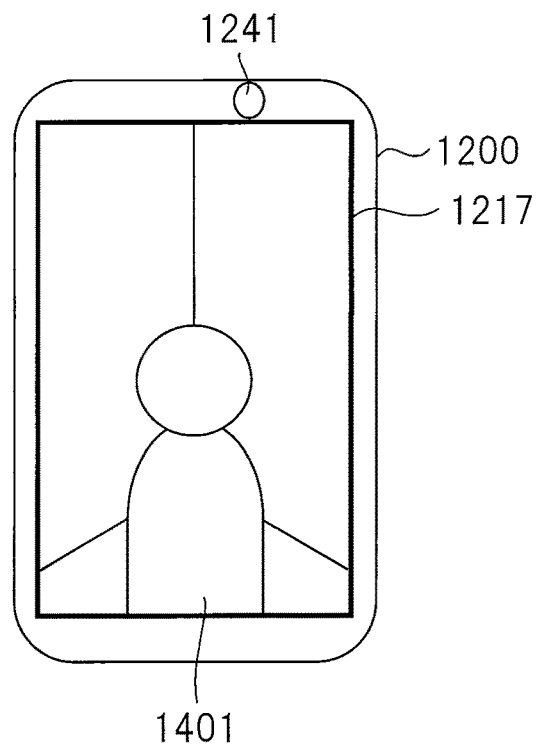
(b)
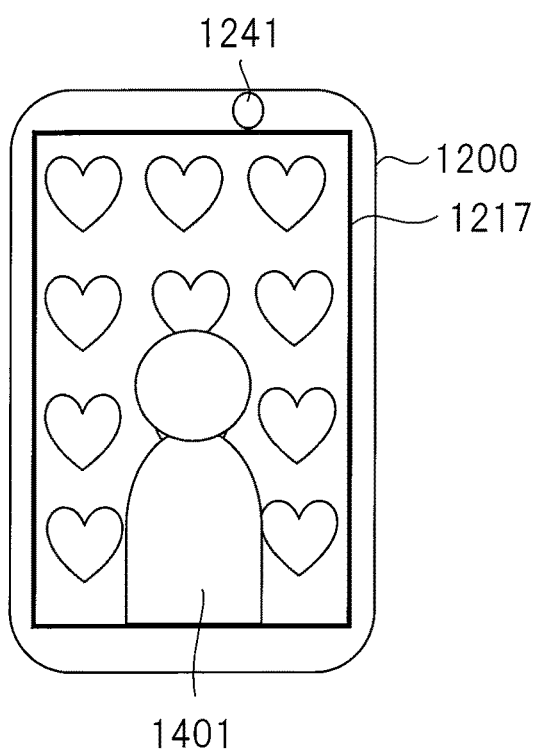

IMAGE-CAPTURING DEVICE, IMAGE-CAPTURING APPARATUS AND METHOD OF ACQUIRING DISTANCE IMAGE

TECHNICAL FIELD

The present invention relates to an image-capturing device, an image-capturing apparatus and a method of acquiring a distance image, and, more particularly relates to a technique effectively applied to acquisition of the distance image.

BACKGROUND ART

In recent years, a technique of providing an image-capturing device that captures images with a function of acquiring a distance image has been known. For the acquisition of the distance image, for example, a TOF (Time-Of-Flight) method is used. The TOF method is a technique of measuring a distance to a target by measuring time taken from emission of pulse light from a light source toward the target to arrival of reflection light from the target at an observation point.

Regarding such a type of the image-capturing device that acquires both a normal image and a distance image, for example, a Patent Document 1 is cited. This Patent Document 1 describes that the image-capturing device includes: a light emitting device configured to emit light toward a subject; a photodiode (PD); a pixel memory connected to the PD; an image-capturing device provided with a plurality of two-dimensionally arranged pixels each having a FD connected to the pixel memory through a switch; a driving circuit 105 configured to allow the switch to be connected in a duration from start of a charge accumulating duration including a light emitting duration of the light emitting device to predetermined time of the light emitting duration, and configured to drive the image-capturing devices so as to read a first signal corresponding to a charge accumulated in the FD after disconnecting the switch and read a second signal corresponding to a charge accumulated in the pixel memory after elapse of the charge accumulating duration; and a signal processing circuit 107 configured to calculate a distance to the subject on the basis of the first signal and the second signal.

RELATED ART DOCUMENT

Patent Document

Patent Document 1: Japanese Patent Application Laid-Open Publication No. 2015-201733

SUMMARY OF THE INVENTION

Problems to be Solved by the Invention

In the image-capturing device of the above-described cited reference 1, in a case of acquiring the normal image and a case of acquiring the distance image, a driving method of reading the signals from the image-capturing device is made different between the case for the normal image and the case for the distance image. Therefore, the normal image and the distance image cannot be simultaneously acquired at the same frame timing.

Thus, it is conceivable that a color image and the distance image are acquired while being switched to each other for each frame. However, in this case, each acquisition frame rate of the color image and the distance image undesirably becomes half.

As a result, when the distance image is acquired, it is difficult to acquire a color image having high definition. The distance image also has a risk of decrease in a signal-to-noise ratio, which results in decrease in distance measuring accuracy.

An object of the present invention is to provide a technique capable of acquiring the color image having the high definition without losing sensitivity to the distance image.

The above and other objects and novel characteristics of the present invention will be apparent from the description of the present specification and the accompanying drawings.

Means for Solving the Problems

The summary of the typical aspects of the inventions disclosed in the present application will be briefly described as follows.

That is, a typical image-capturing device has a sensor, a visible-light-pixel driver and a non-visible-light-pixel driver. The sensor is configured to have a plurality of visible light pixels having sensitivity to the visible light and a plurality of non-visible light pixels having sensitivity to the non-visible light.

The visible-light-pixel driver controls light exposure to the visible light pixels and a reading operation for charges generated by photoelectric conversion of the visible light pixels resulting from the light exposure. The non-visible-light-pixel driver controls light exposure to the non-visible light pixels and a reading operation for charges generated by photoelectric conversion of the non-visible light pixels resulting from the light exposure.

The non-visible-light-pixel driver performs light exposure to previously-set every two or more non-visible light pixels at the time of the light exposure to the non-visible light pixels and the reading operation, sums charges that are generated by photoelectric conversion of the two or more non-visible light pixels resulting from the light exposure, and creates the distance image on the basis of the summed charges.

Particularly, the non-visible-light-pixel driver performs control so that at least apart of the first light-exposure duration in which the light exposure to the two or more non-visible light pixels is performed overlaps the second light-exposure duration in which the light exposure to the visible light pixels is performed.

Effects of the Invention

The effects acquired by the typical aspects of the present invention disclosed in the present application will be briefly described below.

A color image having high definition and a distance image having high SN ratio can be acquired.

BRIEF DESCRIPTIONS OF THE DRAWINGS

FIG. 10 is an explanatory diagram showing another example of the pixel array in the image-capturing device of FIG. 9;

FIG. 11 is an explanatory diagram showing another example of the pixel array in the image-capturing device of FIG. 10;

FIG. 16 is an explanatory diagram showing one example of display of a virtual object of FIG. 15 on a display of a mobile terminal by using the augmented reality;

FIG. 17 is an explanatory diagram showing an application example using a mobile terminal according to a second embodiment;

BEST MODE FOR CARRYING OUT THE INVENTION

The same members are denoted by the same reference symbols throughout all the drawings for describing the embodiments in principle, and the repetitive description thereof will be omitted.

Hereinafter, the embodiments will be described in detail.

First Embodiment

<Pixel Configuration Example of Image-Capturing Device>

Figure 1:
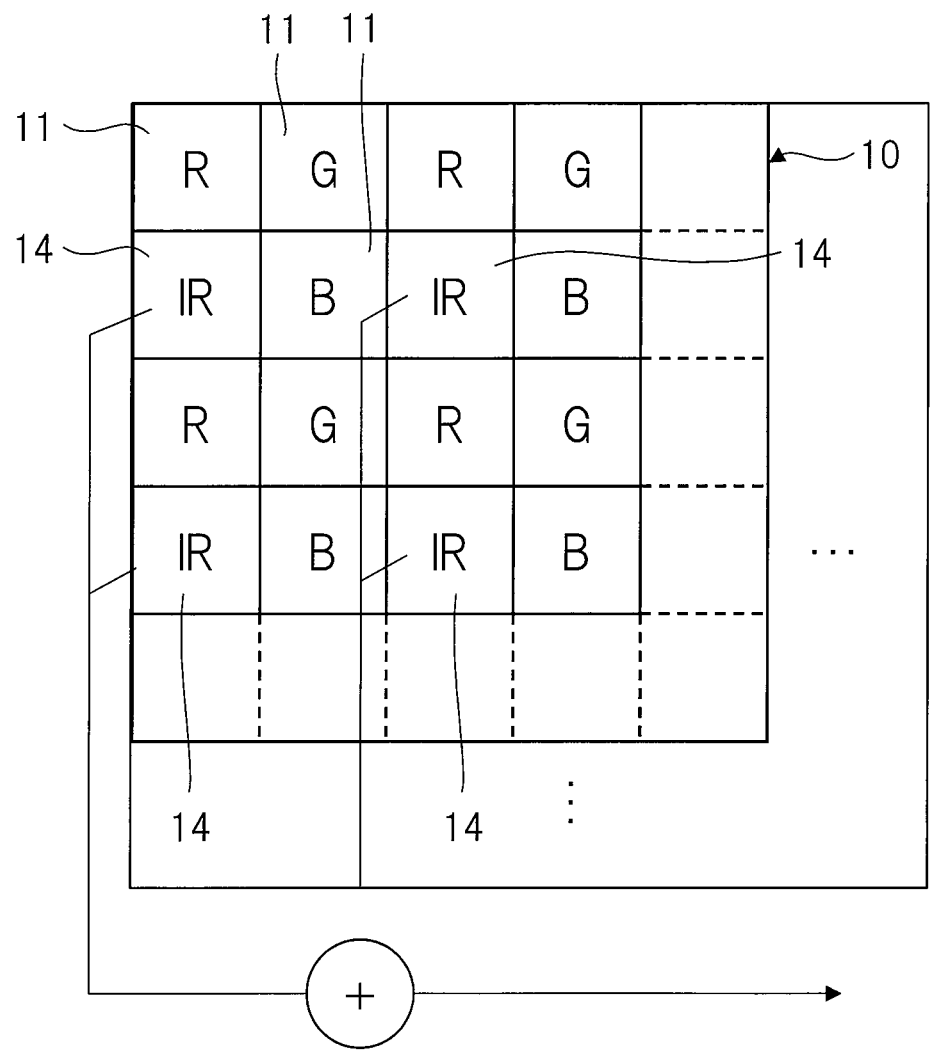
FIG. 1 is an explanatory diagram showing one example of a configuration in an image-capturing device according to a first embodiment.

FIG. 1 is an explanatory diagram showing one example of a configuration in an image-capturing device according to a first embodiment.

An image-capturing device 10 has a visible light pixel 11 and a non-visible light pixel 14. A sensor is made of these visible light pixel 11 and non-visible light pixel 14.

The visible light pixel 11 has a color filter having sensitivity to a visible light range of red (R), green (G) or blue (B). The non-visible light pixel 14 is a pixel that receives near-infrared light close to a non-visible light range. In the drawing, note that apart denoted with "R", "G" or "B" is the visible light pixel 11, and a part denoted with "IR" is the non-visible light pixel 14. The drawings showing the pixels of the image-capturing device will be similarly described below.

The visible light pixels 11 and the non-visible light pixel 14 are arranged in a grid-from pattern, and such arrangement is so-called Bayer array. In the Bayer array, the R pixel, the G pixel, the G pixel and the B pixel are arrayed in the grid form as one set. In the case of the image-capturing device 10 shown in FIG. 1, the non-visible light pixel 14 is arrayed in place of one G pixel of the two G pixels configuring the Bayer array. That is, the R pixel, the G pixel, the B pixel and the non-visible light pixel 14 are arrayed clockwise from an upper left corner of FIG. 1.

Therefore, one set is made of one non-visible light pixel 14 and the visible light pixels 11 that are the R pixel, the G pixel and the B pixel. The visible light pixels 11 that are the R pixel, the G pixel and the B pixel in one set are pixels for use in capturing the color image. The non-visible light pixel 14 is a pixel for use in capturing the distance image on the basis of a principle of a TOF (Time-Of-Flight) sensor.

In the visible light pixels 11 having the sensitivity to the visible light range, the respective photoelectrically-converted charges are independently read. On the other hand, from a predetermined number of non-visible light pixels 14, for example, from four non-visible light pixels 14, mixed charges are read.

Generally, the color image is created so as to have the sufficient sensitivity in order to capture the image of the visible light of nature or room illumination light. Meanwhile, the TOF sensor acquires the distance-measured image by emitting the infrared light that is necessary for the distance measurement for acquiring the distance image and performing the photoelectric conversion to its reflection light. Therefore, its light amount is limited more than that of the visible light.

Thus, it is necessary to enhance the sensitivity of only the non-visible light pixel. However, it is difficult to enhance the sensitivity of only the pixel for use in the IR of the image-capturing device having the pixels to be photoelectrically converted are uniformly formed on the image-capturing device, that is, only the non-visible light pixel.

Thus, when the mixed charges are read from the plurality of pixels only in the non-visible light pixels 14 as described above in the configuration of FIG. 1, a received light amount of the mixed non-visible light pixels becomes about four times. As a result, a signal amount to the near-infrared (IR) light can be increased. As a result, a signal-to-noise ratio (SN ratio) of the distance image can be improved, and therefore, a favorable distance image can be acquired.

Since the respective charges are independently read from the R pixel, the G pixel and the B pixel, a color image having high definition can be acquired. Further, the color image and the distance image can be acquired at the same frame timing, that is, the same frame rate.

Note that FIG. 1 shows the example of the reading from the mixed four non-visible light pixels 14 as described above. However, the number of the mixed non-visible light pixels 14 is not limited to this. For example, when the number of pixels of the image-capturing device 10 is 16 megapixels, the number of the mixed non-visible light pixels 14 may be about 16 pixels.

<Configuration Example of Image-Capturing Device>

Subsequently, details of the image-capturing device 10 will be described.

Figure 2:
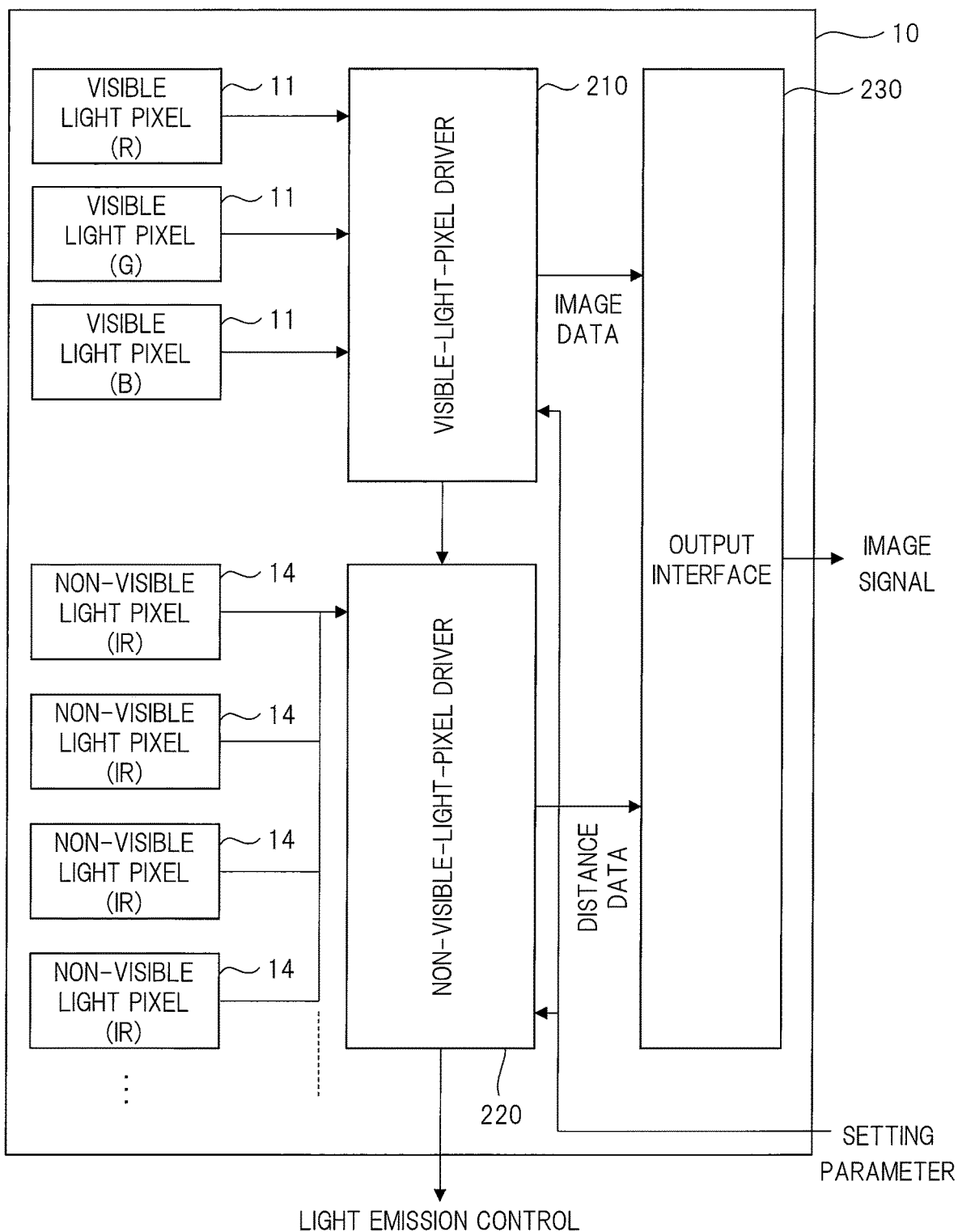
FIG. 2 is a block diagram showing one example of the configuration in the image-capturing device of FIG. 1.

FIG. 2 is a block diagram showing one example of the configuration in the image-capturing device of FIG. 1.

The image-capturing device 10 has the visible light pixels 11, the non-visible light pixels 14, a visible-light-pixel driver 210, a non-visible-light-pixel driver 220, and an output interface 230 as shown in FIG. 2. The visible light pixels 11 are the R pixel, the G pixel and the B pixel shown in FIG. 1, that are pixels having sensitivities to red (R), green (G) and blue (B), respectively. Similarly, the non-visible light pixels 14 are pixels that receive the near-infrared light close to the non-visible light range shown in FIG. 1.

The visible-light-pixel driver 210 drives each of the visible light pixels 11 that are the R pixel, the G pixel and the B pixel included in the image-capturing device 10. The non-visible-light-pixel driver 220 drives the non-visible light pixels 14 included in the image-capturing device 10. This non-visible-light-pixel driver 220 also outputs an IR emission control signal for use in capturing the distance image as the TOF sensor.

The output interface 230 is an interface that outputs an output of each of the visible-light-pixel driver 210 and the non-visible-light-pixel driver 220 as an image signal of the image-capturing device 10.

<Circuit Example of Visible-Light-Pixel Driver and Non-Visible-Light-Pixel Driver>

Subsequently, driving and reading operations for the visible light pixels 11 will be described.

Figure 3:
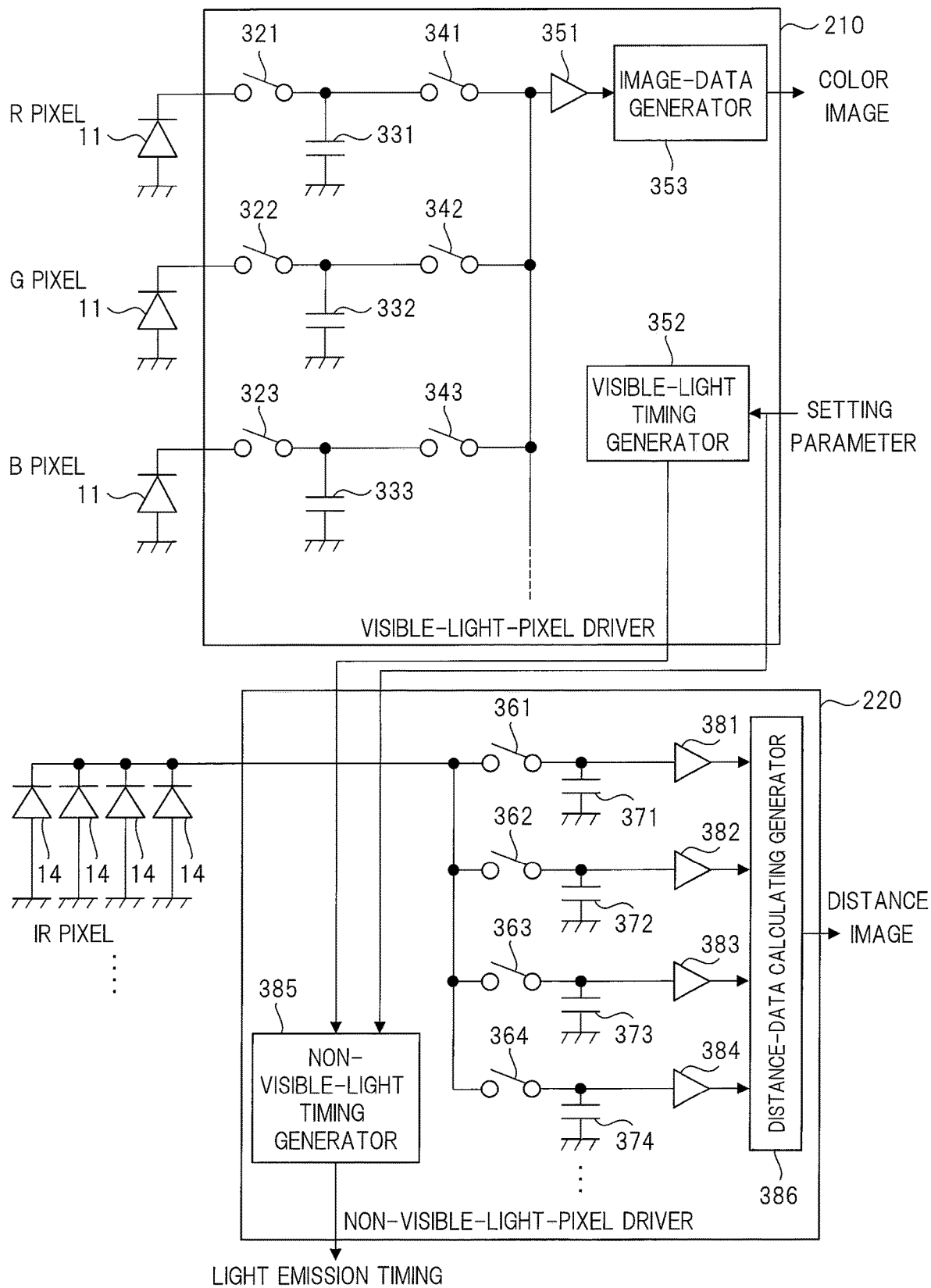
FIG. 3 is an explanatory diagram showing one example of equivalent circuit diagrams of a visible-light-pixel driver and a non-visible-light-pixel driver included in the image-capturing device of FIG. 2.

FIG. 3 is an explanatory diagram showing one example of equivalent circuit diagrams of the visible-light-pixel driver and the non-visible-light-pixel driver included in the image-capturing device of FIG. 2.

For simplification, note that FIG. 3 shows only an equivalent circuit configuration corresponding to three visible light pixels as the visible-light-pixel driver 210, and shows only an equivalent circuit configuration corresponding to four non-visible light pixels 14 as the non-visible-light-pixel driver 220.

The visible-light-pixel driver 210 has switches 321 to 323, switches 341 to 343, capacity devices 331 to 333, an amplifier 351, an image-data generator 353 and a visible-light timing generator 352.

In the image-capturing device 10, each of the visible light pixels 11 is made of, for example, a photodiode. A cathode of the photodiode is connected to one connecting portion of each of the switches 321 to 323.

To another connecting portion of each of the switches 321 to 323, one connecting portion of each of the capacity devices 331 to 333 and one connecting portion of each of the switches 341 to 343 are connected. Another connecting portion of each of the capacity device 331 to 333 is connected to a reference potential.

Another connecting portion of each of the switches 341 to 343 is commonly connected to an input portion of the amplifier 351, and an input portion of the image-data generator 353 is connected to an output portion of the amplifier 351. An output signal from the output portion of this image-data generator 353 becomes the image data.

The switches 321 to 323 are switches that introduce the charges therein, the charges being generated by the photoelectric conversion of the respective visible light pixels 11 that are the R pixel, the G pixel and the B pixel. The capacity devices 331 to 333 convert the introduced charges into voltages.

The switches 341 to 343 sequentially read the accumulated charges in the respective capacity devices 331 to 333. The amplifier 351 is a reading amplifier that amplifies the voltages that are converted by the capacity devices 331 to 333. The image-data generator 353 converts the pixel output read by the amplifier 351 into, for example, digital data, and outputs the data.

The visible-light timing generator 352 generates a control signal or others for controlling turning On/OFF of the switches 321 to 323 and the switches 341 to 343 and others. In the manner, the reading from each visible light pixel 11 is performed at a timing described later.

The visible-light timing generator 352 is connected so as to receive a setting parameter that is an input control command from outside as its input, and can set a timing parameter for light exposure time or others on the basis of the setting parameter.

The timing parameter set on the basis of the setting parameter is stored in a not-illustrated register included in the visible-light timing generator 352. The setting parameter is output from, for example, a microcomputer or others that controls the image-capturing device 10.

The non-visible-light-pixel driver 220 has switches 361 to 364, capacity devices 371 to 374, amplifiers 381 to 384, distance-data calculating generator 386 and a non-visible-light timing generator 382. The switches 361 to 364 configure a first switching unit. The capacity devices 371 to 374 configure a first capacity. The amplifiers 381 to 384 configure an amplifying unit.

The non-visible light pixel 14 is also made of the photodiode as similar to the visible light pixel 11. Each cathode of the photodiodes that are the four non-visible light pixels 14 are commonly connected to one connecting portion of each of the similarly commonly connected switches 361 to 364.

To another connecting portion of each of the switches 361 to 364, one connecting portion of each of the capacity devices 371 to 374 and an input portion of each of the amplifiers 381 to 384 are connected. An input portion of the distance-data calculating generator 386 is connected to an output portion of each of the amplifiers 381 to 384, and the distance image containing the distance data is output from an output portion of the distance-data calculating generator 386.

This description exemplifies the case of the reading of the mixed charges of the four non-visible light pixels 14 as described with reference to FIG. 1. However, the number of the non-visible light pixels 14 that are mixed and read is not limited to four. For example, when the charges of eight non-visible light pixels 14 are mixed and read, cathodes of photodiodes that are commonly-connected eight non-visible light pixels 14 and eight switches are configured so as to be commonly connected to each other.

The rest of electrostatic capacities and amplifiers are also configured so that the numbers of them are the same as the number of the mixed and read non-visible light pixels 14. Therefore, each of eight electrostatic capacities and eight amplifiers is arranged, and the input portion of the distance-data calculating generator 386 is connected to each of output portions of the eight amplifiers.

The switches 361 to 364 are switches that introduce charges therein, the charges being generated by the photoelectric conversion of the commonly-connected non-visible light pixels 14. The capacity devices 371 to 374 convert the introduced charges into voltages.

Figure 5:
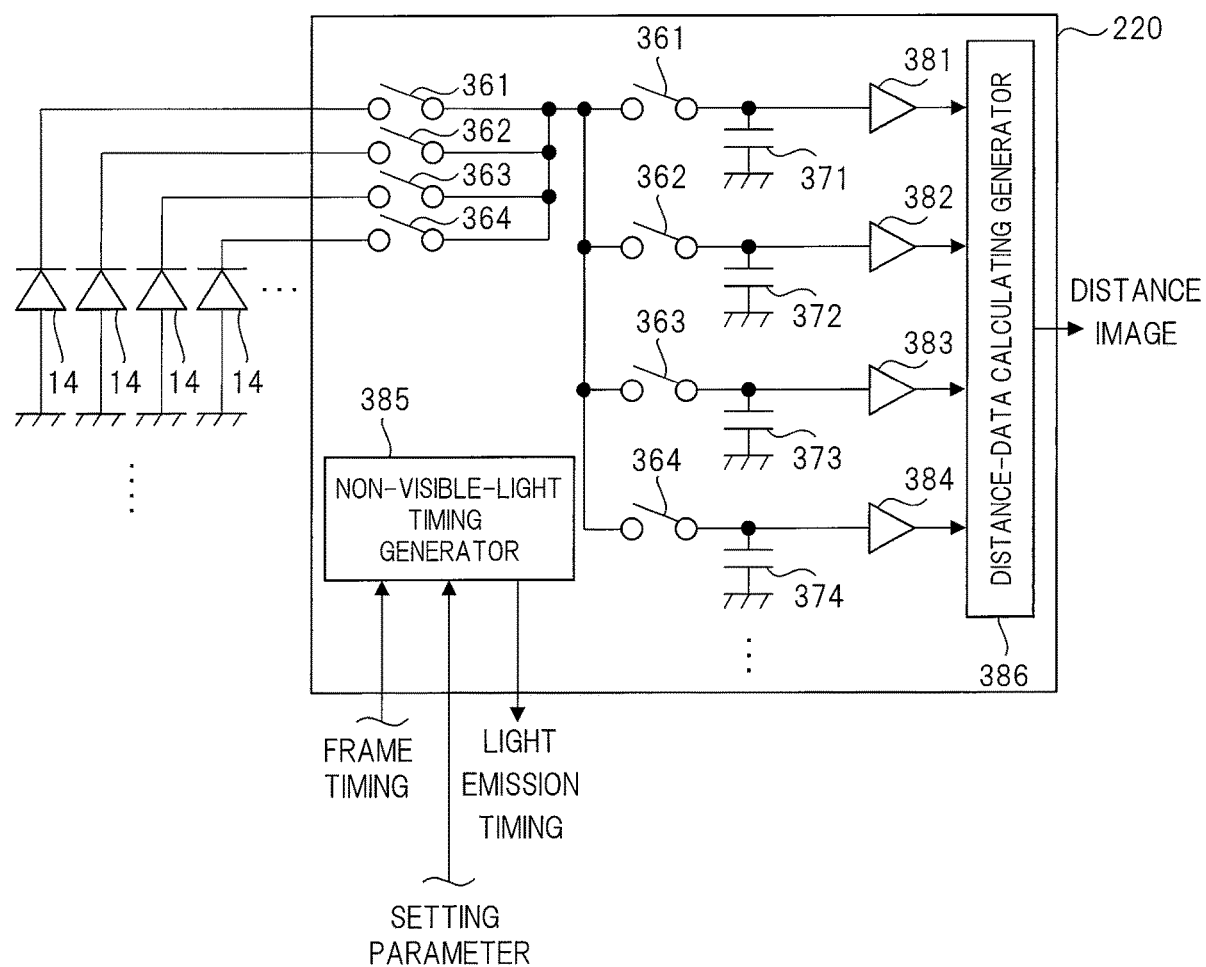
FIG. 5 is an explanatory diagram showing another example in the equivalent circuit diagram of the non-visible-light-pixel driver of FIG. 3.

Note that FIG. 5 shows the configuration in which the switches 361 to 364 are arranged in the non-visible-light-pixel driver 220. However, these switches 361 to 364 may be configured to be arranged in the image-capturing device 10.

The amplifiers 381 to 384 amplify the voltages that are converted by the capacity devices 371 to 374. The distance-data calculating generator 386 that is a distance-image calculator converts a read pixel output that is output from the amplifiers 381 to 384 into, for example, digital data, and outputs the data, and besides, performs a TOF calculation, so that the distance image with the calculated pixel data of the distance image is output.

The non-visible-light timing generator 385 that is a timing controller generates a control signal for turning ON/OFF of the switches 361 to 364 that read the charges of the non-visible light pixels 14. This non-visible-light timing generator 385 is connected so as to receive each of the frame timing and the setting parameter that are output from the visible-light timing generator 352 as its input. This frame timing becomes a frame rate of the color image read by the image-capturing device 10.

<Reading Operation Example>

Figure 4:
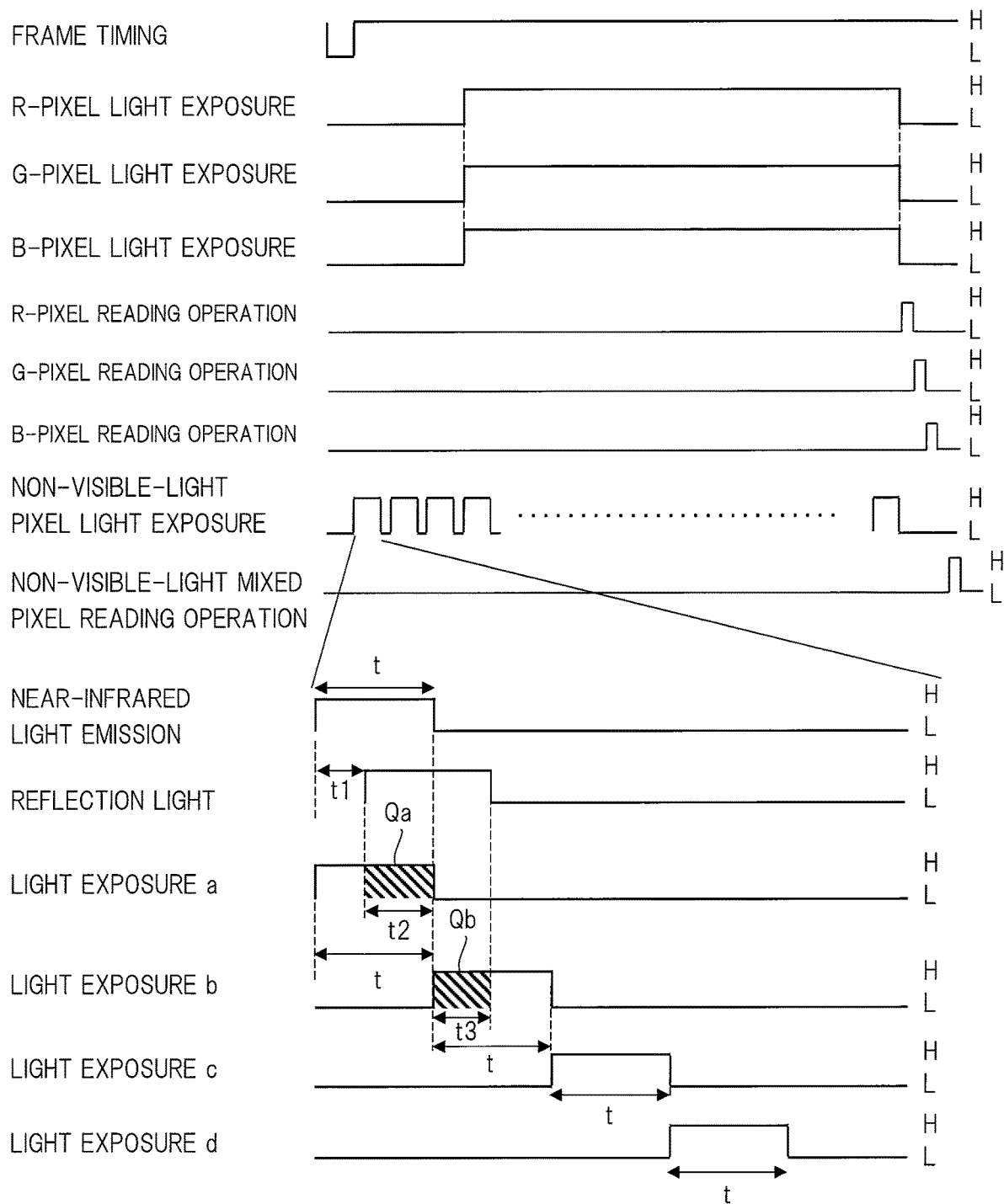
FIG. 4 is a timing chart showing one example of each read timing of the visible-light-pixel driver and the non-visible-light-pixel driver of FIG. 3.

FIG. 4 is a timing chart showing one example of each charge read timing of the visible-light-pixel driver and the non-visible-light-pixel driver of FIG. 3.

From an upper side to a lower side, FIG. 4 shows the frame timing and each signal timing of the R-pixel light exposure, the G-pixel light exposure, the B-pixel light exposure, the R-pixel reading operation, the G-pixel reading operation, the B-pixel reading operation, the non-visible-light-pixel light exposure and the non-visible-light-pixel reading operation.

The frame timing is a signal indicating a timing of the image light exposure for the acquisition of the color image. The R-pixel light exposure is a light exposure timing of the visible light pixel 11 that is the R pixel, and indicates a duration in which this visible light pixel 11 introduces the light therein. The G-pixel light exposure is a light exposure timing of the visible light pixel 11 that is the G pixel. The B-pixel light exposure is a light exposure timing of the visible light pixel 11 that is the B pixel. "Hi" signal durations of the R-pixel light exposure, the G-pixel light exposure and the B-pixel light exposure in FIG. 4 are a second light exposure duration.

The R-pixel reading operation is a read timing of the visible light pixel 11 that is the R pixel. The G-pixel reading operation is a read timing of the visible light pixel 11 that is the G pixel. The B-pixel reading operation is a read timing of the visible light pixel 11 that is the B pixel.

The non-visible-light-pixel light exposure is a timing of the light exposure to the four non-visible light pixels 14, and the non-visible-light-pixel reading operation is a timing of the reading of the mixed charges from the four non-visible light pixels 14. A duration in which a "Hi" signal and a "Lo" signal are repeated in this non-visible-light-pixel light exposure is a first light exposure duration.

First, a reading process performed by the visible-light-pixel driver 210 will be described.

To each of the visible light pixels 11 that are the R pixel, the G pixel and the B pixel, the light exposure and the reading operation are performed on the basis of the frame timing as reference. The light exposure to each of the visible light pixels 11 that are the R pixel, the G pixel and the B pixel is performed at a Hi-signal timing of each of the R-pixel light exposure, the G-pixel light exposure and the B-pixel light exposure.

When each signal occurring in the R-pixel light exposure, the G-pixel light exposure and the B-pixel light exposure transits from the Hi signal to the Lo signal, the control signal for turning ON each of the switches 321 to 323 is output from the visible-light timing generator 352, so that the switches 321 to 323 are turned ON. In this manner, the respective charges of the visible light pixels 11 are forwarded to the capacity devices 331 to 333.

Then, the switch 341 is turned ON in the Hi-signal duration of the R-pixel reading operation, so that the charge of the capacity device 331 is output to the amplifier 351. The switch 342 is turned ON in the Hi-signal duration of the G-pixel reading operation, so that the charge of the capacity device 332 is output to the amplifier 351. The switch 343 is turned ON in the Hi-signal duration of the B-pixel reading operation, so that the charge of the capacity device 333 is output to the amplifier 351.

The control signals for turning ON these switches 341 to 343 are output from the visible-light timing generator 352. In the manner, the charges of the capacity devices 331 to 333 are sequentially output to the amplifier 351, and the charge reading process ends.

Subsequently, a reading process performed by the non-visible-light-pixel driver 220 will be described.

To the four non-visible light pixels 14, the non-visible-light-pixel exposure process is repeatedly performed in the Hi-signal duration of the frame timing as shown in the non-visible-light-pixel light exposure of FIG. 4.

A signal timing diagram below the non-visible-light-pixel mix reading operation of FIG. 4 shows each timing of the above-described non-visible-light-pixel light exposure process, and shows each signal timing of the near-infrared light emission, the reflection light, light exposure "a", light exposure "b", light exposure "c" and light exposure "d" from up to down.

The near-infrared light emission timing is an emission timing of the infrared light emitted by an IR light source 1103 included in an image-capturing apparatus of FIG. 13 described later.

First, the non-visible-light timing generator 385 generates a light emission timing signal, and outputs the signal to the IR light source 1103. The light emission timing signal is a signal for allowing the IR light source 1103 to emit the near-infrared light, and the IR light source 1103 emits the near-infrared light on the basis of, for example, the light emission timing signal that is the Hi signal.

When the IR light source 1103 that is a light source emits the near-infrared light, the light exposure is sequentially performed in an order from the light exposure "a" to the light exposure "d" as shown in the drawing. Therefore, the non-visible-light timing generator 385 outputs the control signals so that the switches 361 to 364 are sequentially turned ON for each end of the light exposures "a" to "d".

For example, in the light exposure "a", when the light exposure to the non-visible light pixel 14 corresponding to the light exposure "a" ends, the switch 361 is turned ON. Next, in the light exposure "b", when the light exposure to the non-visible light pixel 14 corresponding to the light exposure "b" ends, the switch 362 is turned ON.

The reflection light of the near-infrared light emitted from the IR light source 1103 reaches the image-capturing device 10 so as to be delayed by time "t1" in accordance with a distance to the subject. By the near-infrared light that has reached so as to be delayed by the time "t1", the charges are accumulated in the capacity devices 371 to 374 at respective light exposure timing of the Hi-signal durations of the light exposure "a" to the light exposure "d".

In the case shown in FIG. 4, at the light exposure timing of the light exposure "a", the reflection light in a duration of time "t2" shown with hatching is photoelectrically converted, and the photoelectrically-converted charge "Qa" is accumulated in the capacity device 371. At the light exposure timing of the light exposure "b", the reflection light in a duration of time "t3" similarly shown with hatching is photoelectrically converted, and the photoelectrically-converted charge "Qb" is accumulated in the capacity device 372.

Therefore, since the photoelectrically-converted and accumulated charge is different between the Hi-signal duration of the light exposure "a" and the Hi-signal duration of the light exposure "b" because of the delay of the reaching of the reflection light of the near-infrared light by the time t1 in accordance with the distance to the subject, the distance to the subject can be calculated from the charge amounts of the charges Qa and Qb by the distance-data calculating generator 386.

Also, the distance can be also acquired from a ratio between the charge Qa and the charge Qb. When the distance is acquired from the ratio between the charge Qa and the charge Qb, influence of difference therebetween in a reflectance of the subject and influence of the disturbance near-infrared light other than the light source for the near-infrared light can be eliminated.

In the light exposure "c" and the light exposure "d", also when the distance to the subject is larger, in other words, also when reflection time of the near-infrared light is longer, the distance measurement can be acquired from the output of the non-visible light pixel 14, so that a distance measuring area can be expanded with keeping the distance measuring accuracy.

Note that the section of the present first embodiment has described the example of four phases of the light exposure "a" to the light exposure "d". However, the number of the detection phases is not limited to this.

The reading operation of the mixed charges of the non-visible light pixels 14 that are repeatedly accumulated by the light exposure to the non-visible light pixels during one frame is performed at the Hi-signal timing of the non-visible-light mixed pixel reading operation at the end of the frame timing. The non-visible-light mixed pixel reading operation is a process for calculating the distance to the subject by the distance-data calculating generator 386 and outputting the distance image.

Regarding the timing of the IR mixed pixel reading operation, when one reading operation is performed for not each one frame but each several frames, the accumulated light amounts of the non-visible light pixels 14 can be more acquired, so that the SN ratio of the distance image can be more increased.

As described above, by the reading operation of the mixed charges of the four non-visible light pixels 14, an amount of the received light of the mixed non-visible light pixels 14 nearly becomes a multiple of the number of the mixed pixels. As a result, a signal amount of the near-infrared light can be increased.

In this manner, since the signal to noise ratio (SN ratio) of the distance image can be increased, the favorable distance image can be acquired. Since the charges of the respective visible light pixels 11 that are the R pixel, the G pixel and the B pixel are independently read, the color image having the high definition can be acquired. Further, the color image and the distance image can be acquired at the same frame timing.

When a pixel pitch of the image-capturing device is made smaller to increase the definition, the number of pixels of the non-visible light pixels 14 can be increased. As a result, the number of the non-visible light pixels 14, the charges of which are mixed and read, can be increased, and therefore, the signal amount of the near-infrared light can be more increased.

In the manner, the image-capturing device 10 capable of acquiring the color image having the high definition and the distance image having the high SN ratio can be provided.

<Circuit Example of Non-Visible-Light-Pixel Driver>

FIG. 5 is an explanatory diagram showing another example in the equivalent circuit diagram of the non-visible-light-pixel driver of FIG. 3.

A non-visible-light-pixel driver 220 of FIG. 5 is different from the non-visible-light-pixel driver 220 of FIG. 3 in that switches 391 to 394 to be the second switch are newly arranged. The turning ON/OFF of these switches 391 to 394 are controlled on the basis of the control signal that is output from the non-visible-light timing generator 385. The switches 391 to 394 are reading switches for the reading operation of the charges of the non-visible light pixels 14 to be mixed.

To one connecting portion of each of the switches 391 to 394, each cathode of the photodiodes forming the non-visible light pixels 14 is connected. Another connecting portion of each of the switches 391 to 394 is commonly connected to one connecting portion of each of the switches 361 to 364. Other connecting configurations are the same as those of FIG. 3, and therefore, are omitted in the description.

For example, in the case of the reading operation of the mixed charges of the illustrated four non-visible light pixels 14, the non-visible-light timing generator 385 is configured to output the control signal so that all the switches 361 to 364 are turned ON.

On the basis of the setting parameter that is the setting information that is input from outside, the non-visible-light timing generator 385 can change a turning-ON timing of each of the switches 391 to 394 to be connected to the photodiodes that are the non-visible light pixels 14. Since the number of the switches to be turned ON can be optionally changed as described above, the number of the non-visible light pixels 14, the charges of which are mixed, can be easily changed.

In the manner, the number of the mixed pixels can be easily changed in a short time in accordance with the signal amounts of the non-visible light pixels 14 that are necessary for the creation of the distance image, and therefore, the distance image having the favorable SN ratio can be created.

<Read Timing Example>

Figure 6:
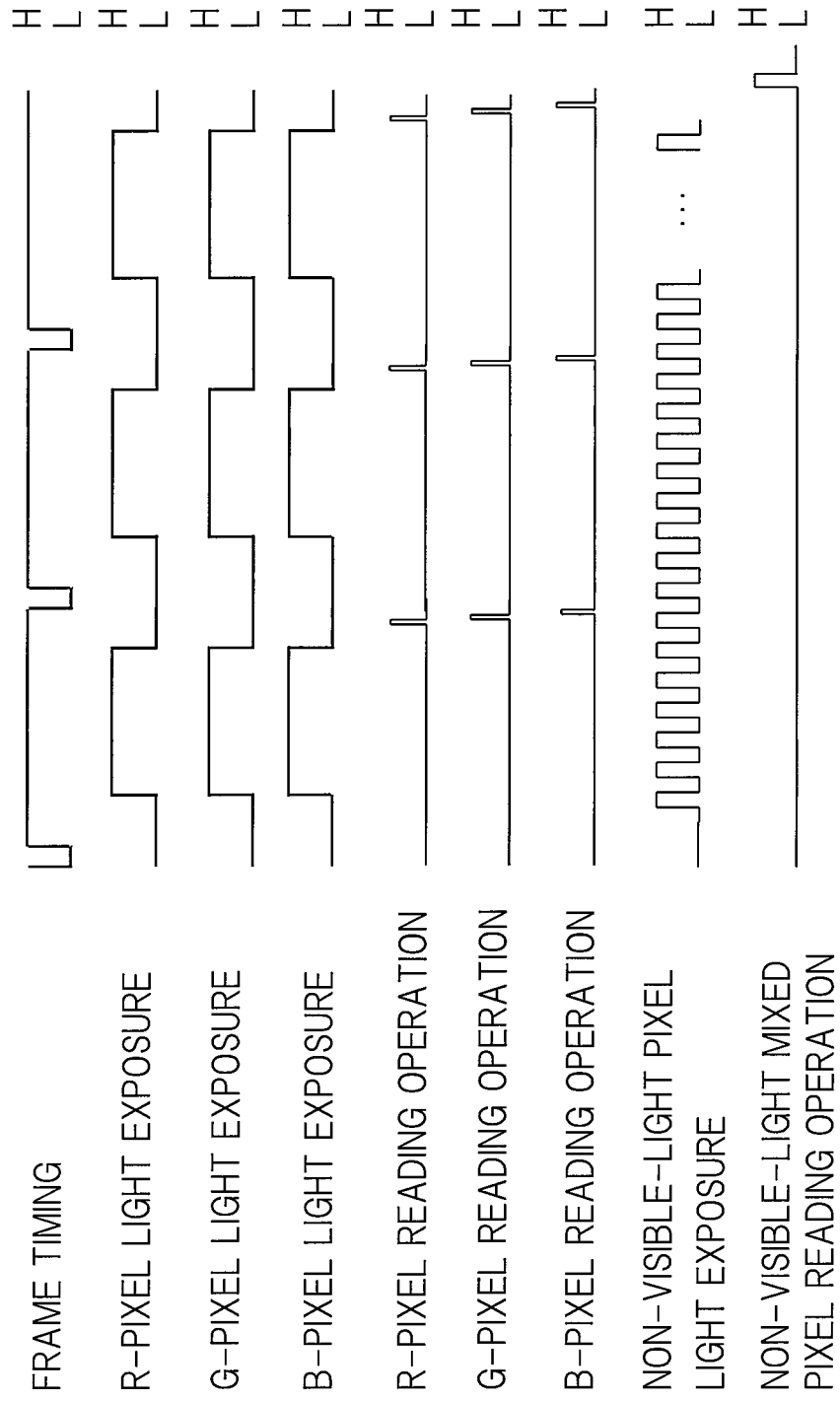
FIG. 6 is a timing chart showing another example of the read timing of FIG. 4.

FIG. 6 is a timing chart showing another example of the read timing of FIG. 4.

FIG. 4 shows a reading example of a frame timing duration corresponding to one frame. However, FIG. 6 shows a reading example of a frame timing duration corresponding to three frames.

From an upper side to a lower side, FIG. 6 shows the frame timing and each signal timing of the R-pixel light exposure, the G-pixel light exposure, the B-pixel light exposure, the R-pixel reading operation, the G-pixel reading operation, the B-pixel reading operation, the non-visible-light-pixel light exposure and the non-visible-light-pixel mixed reading operation.

In the example shown in FIG. 4, the non-visible-light-pixel light exposure in the near-infrared light exposure is repeatedly performed in the duration corresponding to one frame. However, in the example shown in FIG. 6, the non-visible-light-pixel light exposure is repeatedly performed in the duration corresponding to three frames. Then, the charges are read in the Hi-signal duration of the non-visible-light-pixel mixed reading operation of FIG. 6.

Therefore, the non-visible-light-pixel light exposure is continued in the three-frame duration of the frame timing of the visible light pixels 11, and then, the mixed charges are read. In the manner, the timing of the reading operation for the charges of the non-visible light pixels 14 is set to be ⅓ of the timing of the frame rate, so that the visible light image and the distance image can be acquired in accordance with the image-capturing environment or others.

This example of FIG. 6 exemplifies that the timing of the reading operation for the charges of the non-visible light pixels 14 is set to be ⅓ of the timing of the frame rate. However, when the read timing is set to be 1/N ("N" is an integer number) of the timing of the frame rate, the favorable visible light image and distance image can be acquired in accordance with the image-capturing environment or others.

The term "1/N" indicating the read timing is set by using, for example, a setting parameter input from outside. On the basis of the input setting parameter, the non-visible-light timing generator 385 controls the turning ON/OFF timing of the switches 361 to 364 so that the read timing is 1/N of the timing of the frame rate.

In this manner, the mixed amount of the charges of the non-visible light pixels 14 can be easily variable, and the reading timing can be easily set to be, for example, 1/N ("N" is an integer number) of the timing of the frame rate of the visible light pixels 11.

In this manner, when it is necessary to increase the SN ratio but keep the definition of the distance image, a method of setting the read timing of the non-visible light pixels 14 to be 1/N of the timing of the frame rate is applicable. When it is necessary to set the read timing to be the same as the frame timing of the visible light pixels 11, a method of increasing the number of the mixed non-visible light pixels 14 to increase the SN ratio is applicable.

<Regarding Color Filter>

Figure 7:
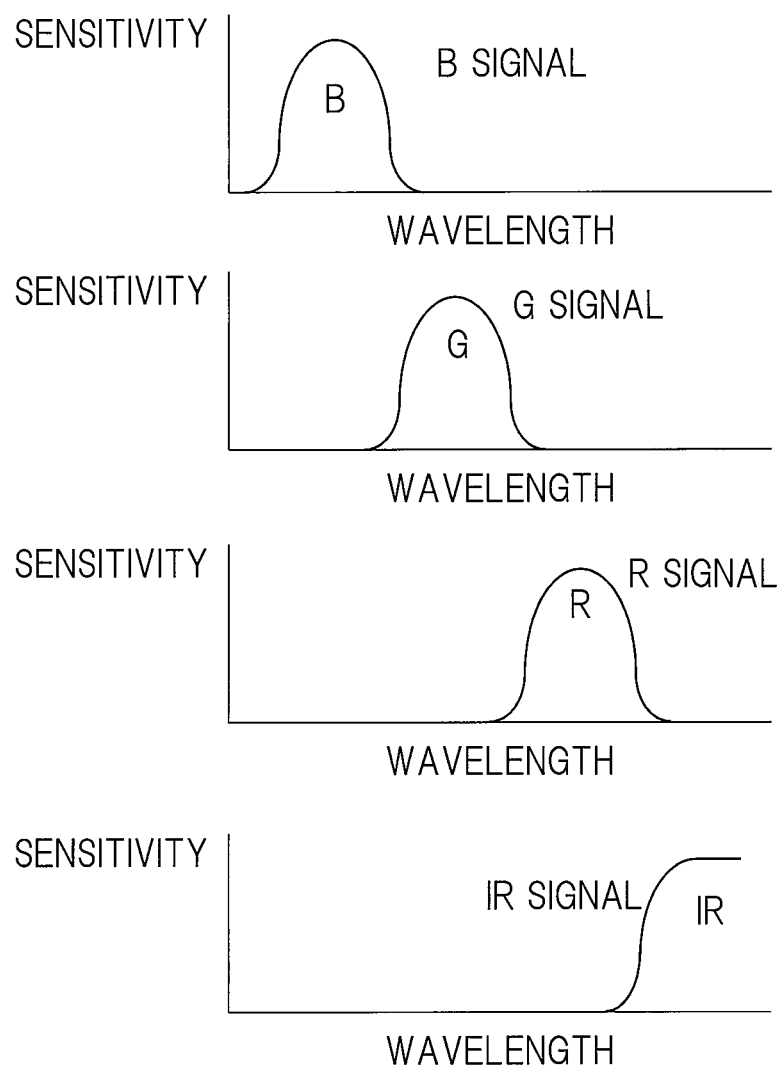
FIG. 7 is an explanatory diagram showing one example of light band pass properties of color filters included in the visible light pixels in the image-capturing device of FIG. 1.

FIG. 7 is an explanatory diagram showing one example of light band pass properties of color filters included in the visible light pixels in the image-capturing device of FIG. 1.

From an upper side to a lower side, FIG. 7 shows each property of a color filer of a blue wavelength band for use in the visible light pixel that is the B pixel, a color filer of a green wavelength band for use in the visible light pixel that is the G pixel, a color filer of a red wavelength band for use in the visible light pixel that is the R pixel, and a color filer of a near-infrared wavelength band for use in the non-visible light pixel 14.

Figure 8:
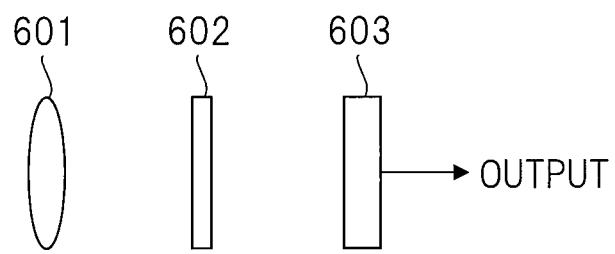
FIG. 8 is a diagram showing a configuration example of the filter for use in the image-capturing device for the color image that does not capture the distance image, according to the studies of the present inventors.

FIG. 8 is a diagram showing a configuration example of the color filter for use in the image-capturing device for the color image that does not capture the distance image, according to the studies of the present inventors.

In the image-capturing device 603 for the color image that does not capture the distance image, not-illustrated color filters using the blue wavelength band and the near-infrared wavelength band (B+IR), using the green wavelength band and the near-infrared wavelength band (G+IR), and using the red wavelength band and the near-infrared wavelength band (R+IR) are used for the B pixel, the G pixel and the R pixel, respectively.

Since a near infrared component is unnecessary, an IR cut filer 602 that transmits only a visible-light wavelength band but cuts the near infrared component is formed on an optical axis between a microlens 601 and the image-capturing device 603, and is configured to remove the unnecessary near-infrared light for the generation of the color signals. The microlens is formed on each pixel included in the image-capturing device 603, and is a lens that introduces the light into each of the pixels.

On the other hand, in the case of the image-capturing device 10 shown in FIG. 1, the filter having the light band pass property shown in FIG. 7 is used. In the case of the visible light pixel 11 that is, for example, the B pixel, a color filter that introduces the blue wavelength band shown on an upper side of FIG. 7 is used.

Similarly, in the case of the visible light pixel 11 that is the G pixel, a color filter that introduces the green wavelength band of FIG. 7 is used. In the case of the visible light pixel 11 that is the R pixel, a color filter that introduces the red wavelength band of FIG. 7 is used. In the manner, the unnecessary near-infrared component for the generation of the color image can be efficiently cut.

In the case of the non-visible light pixel 14, a color filter that introduces the near-infrared wavelength band is used so that a necessary near-infrared component for the distance image can be introduced. When such color filters are used, the favorable color image and distance image can be acquired almost at the same time as each other.

<Pixel Array Example>

Figure 9:
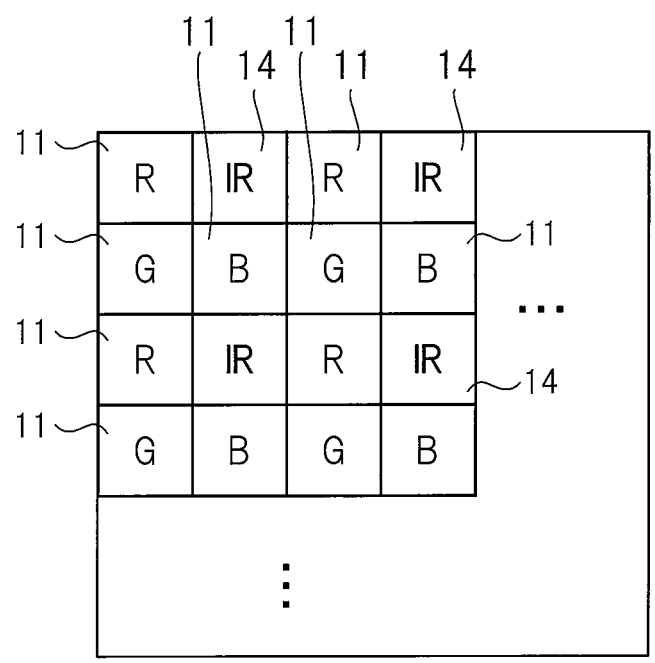
FIG. 9 is an explanatory diagram showing another example of the pixel array in the image-capturing device of FIG. 1.

FIG. 9 is an explanatory diagram showing another example of the pixel array in the image-capturing device of FIG. 1.

The pixel array in the image-capturing device 10 of FIG. 9 is an array in which the G pixel and the IR pixel are exchanged to each other in the pixel array of the image-capturing device 10 shown in FIG. 1. That is, the visible light pixel 11 that is the R pixel, the non-visible light pixel 14, the visible light pixel 11 that is the B pixel, and the visible light pixel 11 that is the G pixel are sequentially arrayed clockwise from a left upper corner of FIG. 9.

FIG. 10 is an explanatory diagram showing another example of the pixel array in the image-capturing device of FIG. 9.

FIG. 9 shows an example of grid-arrayed pixels in which the non-visible light pixel 14 is arrayed every other pixel. However, FIG. 10 (a) shows an example of the grid-arrayed pixels in which the non-visible light pixel 14 is arrayed every four pixels in both a row direction and a column direction.

FIG. 10 (b) shows an example of the grid-arrayed pixels in which the non-visible light pixel 14 is arrayed every four pixels in both a row direction and a column direction in the pixel array shown in FIG. 1.

Also when the pixel arrays shown in FIGS. 10(a) and 10b are applied, the number of the visible light pixels 11 can be increased, and therefore, the definition and the visible-light sensitivity of the color image can be increased.

FIG. 11 is an explanatory diagram showing another example of the pixel array in the image-capturing device of FIG. 10.

FIGS. 11(a) to 11(d) show an example in which two non-visible light pixels 14 are arrayed to be adjacent to each other in the row direction and two non-visible light pixels 14 are arrayed to be adjacent to each other in the column direction. When the non-visible light pixels 14 are arrayed to be adjacent to each other in the row direction and the column direction as shown in this example, it can be easy to form wirings of the non-visible light pixels 14 and the visible light pixels 11 in the image-capturing device 10.

Figure 12:
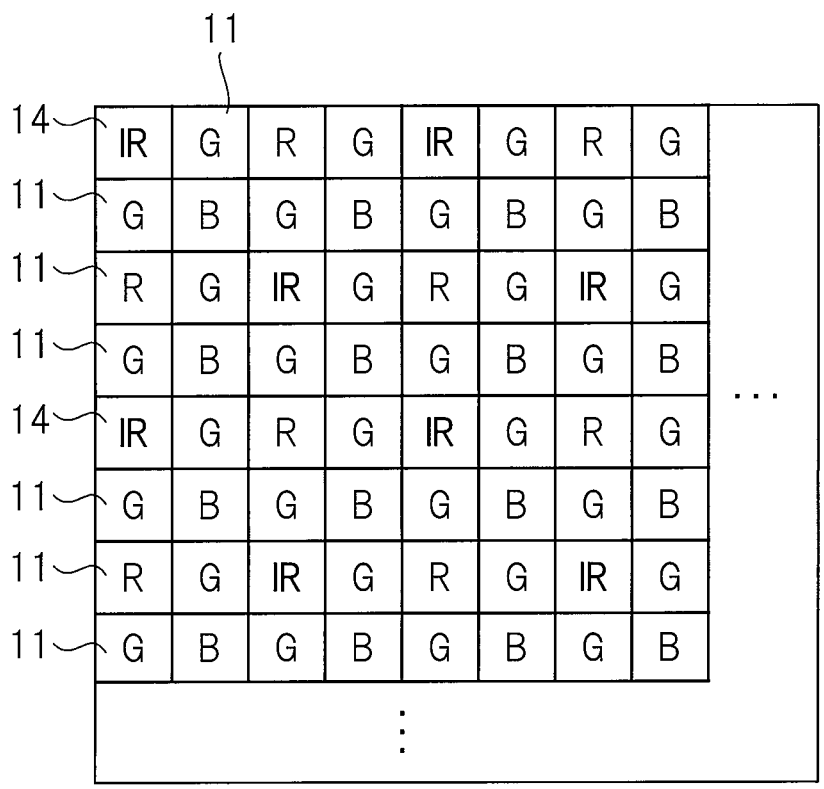
FIG. 12 is an explanatory diagram showing another example of the pixel array in the image-capturing device of FIG. 1.

FIG. 12 is an explanatory diagram showing another example of the pixel array in the image-capturing device of FIG. 1.

As the array in the image-capturing device 10 shown in FIG. 12, an example in which the non-visible light pixel 14 is arrayed every other pixel in an oblique direction is shown.

The photodiode of the image-capturing device that acquires only the color image has the highest sensitivity to the green wavelength band. In a case of an image-capturing device having a sensitivity that peaks on a longer wavelength side, by the pixel array shown in FIG. 12, densities of the R pixel, the G pixel and the B pixel can be made larger than those of the array of the non-visible light pixels 14 shown in, for example, FIGS. 1 and 9. As a result, the sensitivity to the visible light can be increased.

Various pixel array examples have been described above in FIGS. 1 and 9 to 12. However, the array of the non-visible light pixels 14 and the visible light pixels 11 is not limited to these examples.

<Configuration Example of Image-Capturing Apparatus>

Figure 13:
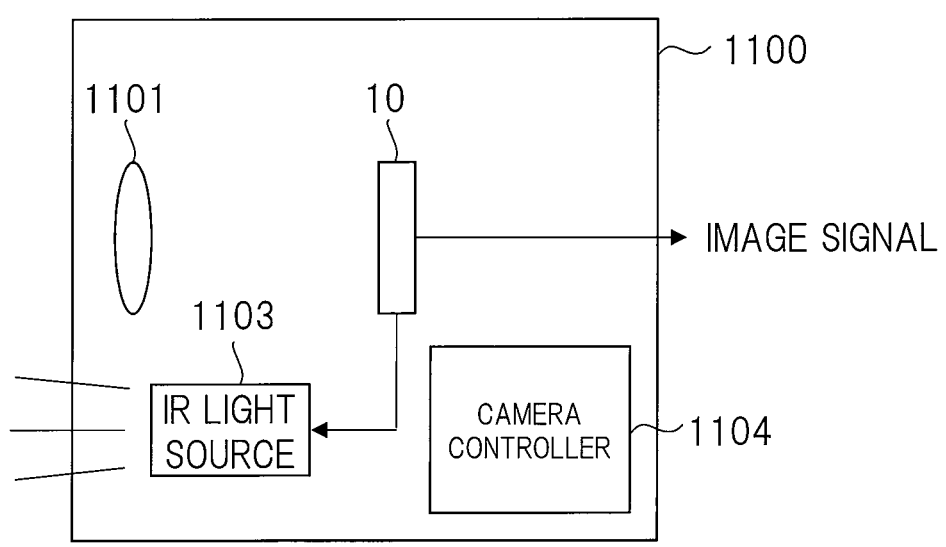
FIG. 13 is an explanatory diagram showing one example of an image-capturing apparatus using the image-capturing device of FIG. 2.

FIG. 13 is an explanatory diagram showing one example of an image-capturing apparatus using the image-capturing device of FIG. 2.

An image-capturing apparatus 1100 has an optical lens 1101, an image-capturing device 10, an IR light source 1103 and a camera controller 1104. The optical lens 1101 forms images such as an image of the subject or others.

The image-capturing device 10 is the same as that of FIG. 2, and acquires the color image and the distance image. The IR light source 1103 emits the near-infrared light. The camera controller 1104 controls light exposure time of the image-capturing device 10, white balance of the color image, and others. The light emission from the IR light source 1103 is controlled at a light emission timing of the near-infrared light generated by the image-capturing device 10 shown in FIG. 4.

When the image-capturing apparatus 1100 is configured of the image-capturing device 10 of FIG. 2 as shown in FIG. 13, the distance image having the favorable SN ratio and the color image having the high definition can be acquired. Further, this configuration can provide the image-capturing apparatus 1100 capable of acquiring the color image and the distance image at the same frame timing.

Note that FIG. 13 shows the configuration in which each of the light exposure and the white balance is controlled by the camera controller 1104. However, a configuration in which the light exposure, the white balance and others are controlled outside the image-capturing apparatus 1100 by using, for example, the image signal output from the image-capturing device 10 may be applied.

As the method of acquiring the distance image and the color image at the same time, a technique of separately mounting a color-image capturing device and a distance-image capturing device is widely used. However, in order to acquire the distance image and the color image at the same time by using the different image capturing devices, it is necessary to match a field of view (an angle of view) between the color-image capturing device and the distance-image capturing device, and therefore, a cost for adjustment of this matching undesirably becomes large.

On the other hand, in the image-capturing apparatus 1100 having the configuration shown in FIG. 13, only one image-capturing device 10 is used. Therefore, thanks to the number of the image-capturing devices, a cost merit, the reduction in the adjustment cost and others can be achieved.

<Configuration Example of Mobile Terminal>

Figure 14:
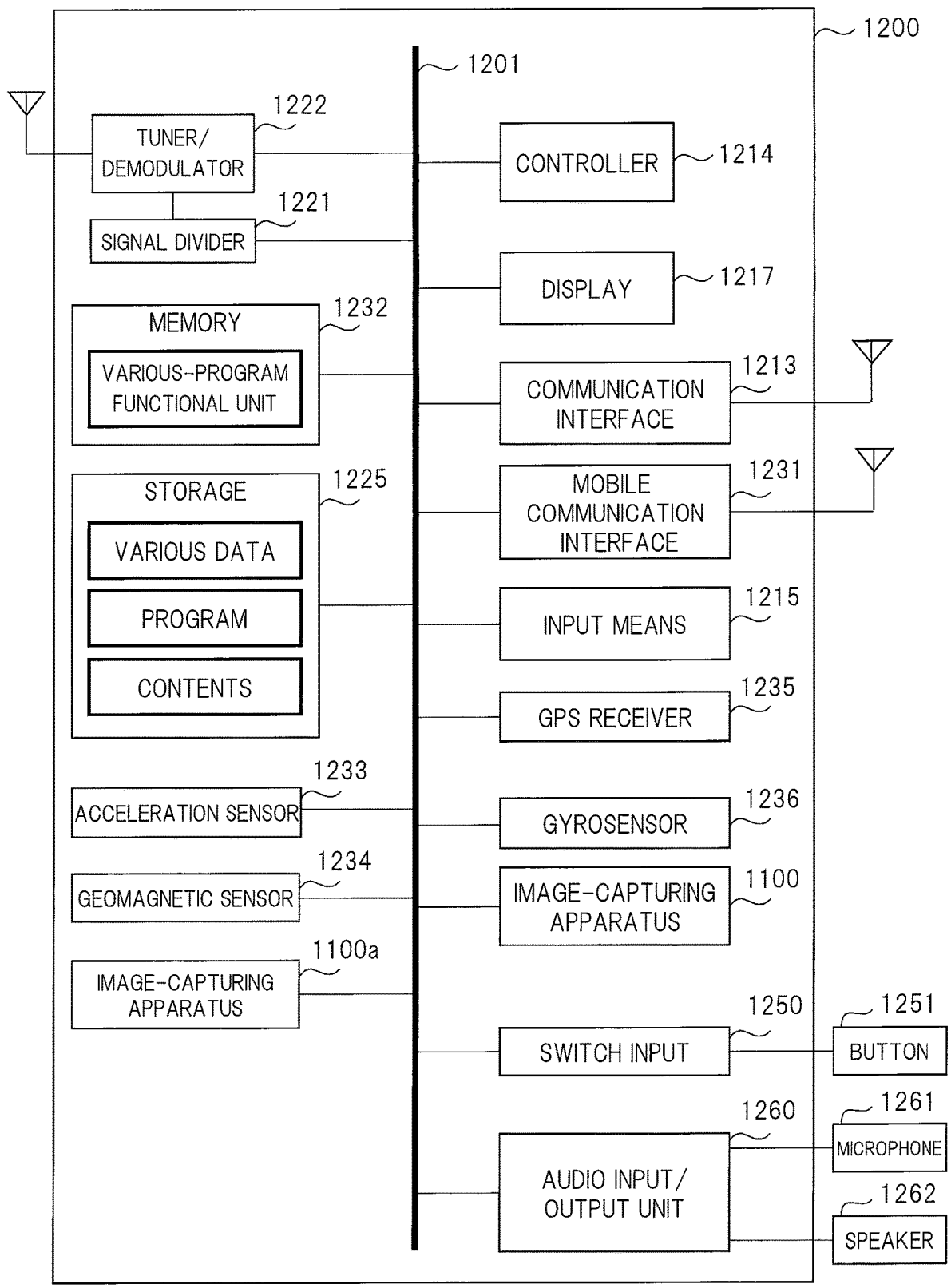
FIG. 14 is an explanatory diagram showing one example of a mobile terminal using the image-capturing apparatus of FIG. 13.

FIG. 14 is an explanatory diagram showing one example of a mobile terminal using the image-capturing apparatus of FIG. 13.

A mobile terminal 1200 is, for example, a tablet, a smartphone, or others. As shown in FIG. 14, this mobile terminal 1200 has a communication interface 1213, a controller 1214, a display 1217, a button 1215, a microphone 1261, a speaker 1262, a signal divider 1221, a tuner/demodulator 1222, a storage 1225, a mobile communication interface 1231, a memory 1232, an acceleration sensor 1233, a geomagnetic sensor 1234, a GPS receiver 1235, a gyro-sensor 1236, an image-capturing apparatus 1100, an image-capturing apparatus 1100a, a switch input unit 1250 and an audio input/output unit 1260. The functional units except for the button 1215, the microphone 1261 and the speaker 1262 are connected to one another through a bus 1201.

The storage 1225 stores application programs, and the controller 1214 evolves the application programs from the storage 1225 to the memory 1232 and executes the evolved application programs, so that various functions can be achieved.

In the following description, for the simplification of the description, various functions that are achieved by the execution of each application program by the controller 1214 are described to be mainly achieved by various program functional units.

Note that the application programs may be previously stored in the storage 1225 before shipment of the mobile terminal 1200, or may be stored in a medium such as an optical medium such as a CD (Compact Disk) or a DVD (Digital Versatile Disk) or a semiconductor memory, and then, be installed into the mobile terminal 1200 through a medium connector not illustrated.

Alternatively, the application programs may be downloaded and installed from a not-illustrated external network through the communication interface 1213 and a not-illustrated wireless router. Alternatively, the application programs may be downloaded and installed from a distribution source through a not-illustrated base station through the mobile communication interface 1231.

Further, through a not-illustrated external apparatus connecting interface, a user can access a personal computer that has acquired the application programs through a network, and then, the application programs can be moved or copied to be installed from the personal computer to the mobile terminal 1200.

Still further, the application programs can be also achieved by hardware as a processing unit having the same function. In the case of the achievement by the hardware, each processing unit mainly achieves each function.

The communication interface 1213 is connected to a not-illustrated wireless router through a wireless LAN (Local Area Network) or others. The communication interface 1213 is connected to the external network through the wireless router, and transmits and receives information to and from a server on the external network.

The direct communication to/from the server without the wireless router is achieved by using a technique such as a wireless LAN such as Wi-Fi (registered trademark) in addition to or in place of the communicating function with the wireless router.

On the communication interface 1213, chips that perform different communication methods from one another may be mounted. Alternatively, one chip that handles a plurality of communication methods may be mounted thereon. Communication to/from another apparatus can be also achieved by using a communication method that is called BLUETOOTH (registered trademark) for use in near distance communication.

The mobile communication interface 1231 is connected to the communication network through the base station by using a third-generation mobile communication system or a mobile communication network such as a LTE (Long Term Evolution) method or a 5G communication that is on a next generation of the LTE, so that the mobile communication interface can transmit/receive the information to/from the server on the communication network, or terminals can share the terminal positions with one another.

The third-generation mobile communication system (hereinafter, referred to as "3G") includes a GSM (registered trademark) (Global System for Mobile Communications) method, a W-CDMA (Wideband Code Division Multiple Access) method, a CDMA 2000 method, a UMTS (Universal Mobile Telecommunications System) method and others.

A priority can be given to connection with an external network through the communication interface 1213 more than connection with the communication network through the mobile communication interface 1231.

The controller 1214 receives a user's operation request from the button 1215 through the switch input unit 1250 or from the microphone 1261 through the audio input/output unit 1260, and controls the signal divider 1221, the display 1217, the communication interface 1213 and various program functional units.

Further, the controller 1214 has a function capable of acquiring various types of information from the external network through the communication interface 1213 and the wireless router or from the server on the external network through the mobile communication interface 1231 and the base station, and capable of passing the information to various program functional units.

The storage 1225 can be controlled by an instruction from the controller 1214 to store the application programs. And, the storage can store various types of information created by the application programs.

The image/audio streaming contents or others may be stored on the basis of signals received from the tuner/demodulator 1222, the communication I/F 1213, or the mobile communication I/F 1231. The storage 1225 may be embedded in the mobile terminal 1200 or be a mobile memory that is detachable from the mobile terminal 1200.

The memory 1232 is controlled by an instruction from the controller 1214. By the controller 1214, the functional unit of the application program stored in the storage 1225 is evolved to the memory 1232.

On the display 1217, the images or videos to be displayed such as images or videos stored in the storage 1225, broadcasted/distributed videos and UI for various operations may be images created by the application programs.

Alternatively, the images or videos may be images or videos of contents received through the tuner/demodulator 1222, or images or videos received from the server on the external network through the communication interface 1213.

Alternatively, the images or videos may be images or videos received from a television through the communication interface 1213, or images or videos distributed from the server on the communication network through the mobile communication interface 1231. The display 1217 may be configured to be unified with, for example, a touch panel described later or others.

The button 1251 is an input unit that receives an operation for the mobile terminal 1200 from the user, and then, inputs the control information related the input operation, and, for example, a touch panel or others can be used for it.

As an example shown in FIG. 14, an example using the touch panel will be described below. However, various operations may be configured to use a physical button. When the touch panel is used, objects or others can be freely moved by a dragging operation or a flicking operation.

The dragging operation is an operation of moving, for example, any object such as an icon on the touch panel while the user is touching the object by using his/her finger. The flicking operation is an operation of moving and flicking the finger on a screen.

By a tapping operation or a double tapping operation, the object such as the icon can be activated, or the screen can be switched to a different screen. The tapping operation is an operation in which the object or others is tapped once by the finger. The double tapping operation is an operation in which the object or others is tapped twice by the finger. In this specification, the description is made so that the operations on the touch panel are referred to as the dragging operation, the flicking operation and the tapping operation.

The tuner/demodulator 1222 and the signal divider 1221 perform tuning/demodulating and signal division of the television, respectively. The acceleration sensor 1233 measures an acceleration applied to the mobile terminal 1200.

The controller 1214 can found which part of the mobile terminal 1200 is oriented to an upper side by, for example, allowing the acceleration sensor 1233 to measure an acceleration of gravity, and perform the display so that an upper side of the screen to be displayed by the display 1217 matches the upper side measured by the acceleration sensor 1233. In the manner, the screen matched with how the user holds the mobile terminal 1200 can be displayed.

The geomagnetic sensor 1234 measures earth magnetism by using a plurality of magnetic sensors or others. The GPS receiver 1235 receives signals transmitted from a plurality of satellites by using a GPS (Global Positioning System). The controller 1214 can calculate position information of the mobile terminal 1200 on the basis of the signals received by the GPS receiver 1235.

The gyrosensor 1236 measures an angular speed of the mobile terminal 1200 caused when the user moves the mobile terminal 1200. Each of both the image-capturing apparatus 1100 and the image-capturing apparatus 1100a is made of the image-capturing apparatus 1100 shown in FIG. 13.

For example, the image-capturing apparatus 1100 is used as a so-called outer camera that captures images of front scenery and people, and the image-capturing apparatus 1100a is used as an inner camera for video chat or self-image capturing as main purposes.

The images captured by the image-capturing apparatus 1100 are recorded in the storage 1225. The controller 214 controls this image record in accordance with a camera control program recorded in the storage 1225.

The controller 1214 controls the superimposed display of the images acquired by the image-capturing apparatus 1100 or others and three-dimensional data of a virtual object stored in the storage 1225 or others on the display 1217.

The audio input/output unit 1260 inputs/outputs audio input signals from the microphone 1261 mounted on the mobile terminal 1200 and audio output signals to the speaker 1262, and audio input/output volume is controlled by the controller 1214.

The switch input unit 1250 receives the switch information through the operation of the physical button 1251, introduces the switch information into the controller 1214 through the bus 1201, and is used in the control for various application programs if needed.

As one example, the switch input unit is used for adjusting a level of the audio output, that is, for controlling the volume to be turned up and down through two buttons that are the buttons 1251. Note that the number of the buttons 1251 may be one or a plural number.

Subsequently, an application example using the above-described mobile terminal of FIG. 14 will be described.

<Application Example>

Figure 15:
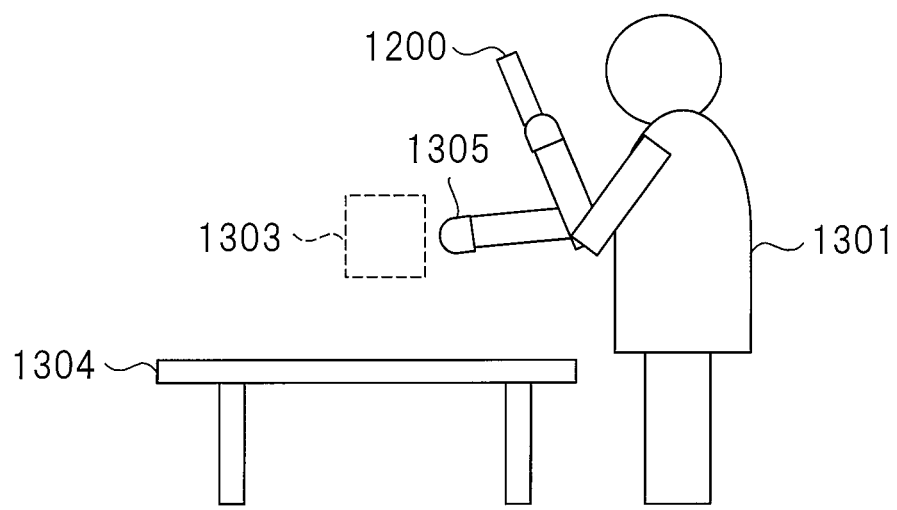
FIG. 15 is an explanatory diagram showing an application example of augmented reality using the mobile terminal of FIG. 14.

FIG. 15 is an explanatory diagram showing an application example of augmented reality using the mobile terminal of FIG. 14.

In recent years, as the application example of the mobile terminal, attention is paid to Augmented Reality (referred to as "AR" below) in which a virtual object that does not really exist is superimposed and displayed on the screen captured by using the color image and the distance image.

FIG. 15 shows a state in which a user 1301 holding the mobile terminal 1200 is capturing an image of a table 1304. In this case, the image is captured by the image-capturing apparatus 1100 attached as the outer camera on a back surface facing the display 1217.

The virtual object 1303 shown with a dot line of FIG. 15 is a virtual object having a defined size in the mobile terminal 1200 and a defined distance to the mobile terminal 1200, and does not really exist. The drawing shows that the user 1301 holds his/her palm over a front side of the virtual object 1303.

<Display Example>

FIG. 16 is an explanatory diagram showing one example of display of the virtual object of FIG. 15 on the display of the mobile terminal by using the augmented reality.

Both FIGS. 16(a) and 16(b) show one example of image synthesized display as the augmented-reality (AR) application. In FIG. 16(a), on the display 1217 of the mobile terminal 1200, each of the table 1304 acquired as the color image and the user's holding palm 1305, and besides, the virtual object 1303 having the same distance as that of the table is displayed.

FIG. 16(b) shows a display example in a case in which the palm 1305 is in a depth direction of the screen. As illustrated in the drawing, when a distance between the virtual object 1303 and the mobile terminal 1200 is smaller, the palm 1305 is displayed so as to be deeper than the virtual object 1303.

The distance image is acquired so that, for example, the pixel positions acquired from the distance image have a small distance therebetween at a large pixel data value and a larger distance therebetween at a smaller pixel data value. Therefore, the virtual object is superimposed and displayed at a pixel position at which the palm 1303 exists farther than the defined distance of the virtual object.

And, the color image can be displayed at a pixel position at which the palm 1303 exists closer than the defined distance of the virtual object. Therefore, an enjoyable application for the user 1301 can be provided.

In such an intended use, the color image and the distance image can be captured for every frame at the same time. Therefore, when the palm 1305 is moved front and back, the superimposed display of the virtual object 1303 can be smoothly performed. Further, as the color image, a high-definition image having the large number of pixels can be displayed.

On the basis of the color image, three-dimensional image capturing data is created by using the distance image. In this case, when high-definition 3D (Dimensions) image data is created by synthesizing an edge of the color image or others with the distance image, the distance image and the color image having no time shift therebetween can be used.

Also in a case such as control for other objects by gestural input, there is no time shift between the distance image and the color image, and therefore, the frame rate can be increased. In the manner, responsive performance of the gestural input can be enhanced.

Second Embodiment

<Second Application Example>

FIG. 17 is an explanatory diagram showing an application example of a mobile terminal according to the present second embodiment.

The FIG. 17 shows an application example of the augmented reality using the mobile terminal 1200 of FIG. 14.

FIGS. 17(a) and 17(b) show a case of the video chat or others using the image-capturing apparatus 1100a of FIG. 14 in which a user 1401 performs the self-image capturing using the image-capturing apparatus 1100a of FIG. 14 that is the inner camera of the mobile terminal 1200.

In FIG. 17(a), the color image captured by the user 1401 using the image-capturing apparatus 1100a is displayed as it is on the display 1217. Therefore, a room background such as a wall is also displayed on the display 1217.

At this time, the image-capturing apparatus 1100a also captures the distance image, and therefore, the distance image is used to superimpose a background that is farther than the user 1401 on a previously-set background screen as shown in FIG. 17(b), and the superimposed image is displayed on the display 1217. The background screen stored in, for example, the storage 1255 of FIG. 14 or others is used.

In this manner, an enjoyable function for the user 1401 can be provided.

Third Embodiment

<Third Application Example>

Figure 18:
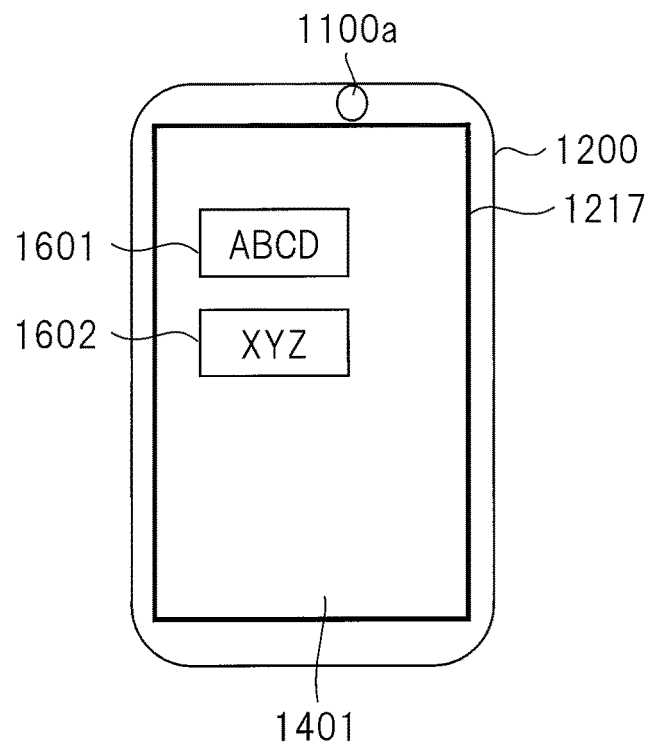
FIG. 18 is an explanatory diagram showing an application example using a mobile terminal according to a third embodiment.

FIG. 18 is an explanatory diagram showing an application example of a mobile terminal according to the present third embodiment.

FIG. 18 shows an application example of the augmented reality using the mobile terminal of FIG. 14. FIG. 18 shows, for example, a state in which the Internet is browsed by using the mobile terminal 1200 and in which the contents on the Internet are displayed on the display 1217.

At this time, the image-capturing apparatus 1100a of FIG. 14 that is the inner camera of the mobile terminal 1200 is operated, so that a distance to a face of the user who is using the mobile terminal 1200 is acquired from the distance image. Then, in accordance with the acquired distance, font sizes of a display content 1601 and a display content 1602 are controlled to be enlarged and shrunk.

For example, when the distance to the face of the user is large, the font sizes of the display contents 1601 and 1602 are enlarged. When the distance to the face of the user is small, the font sizes of the display contents 1601 and 1602 are shrunk.

In the manner, it can be easy to recognize the display contents 1601 and 1602, so that burden on eyes of the user can be reduced.

Fourth Embodiment

<Fourth Application Example>

Figure 19:
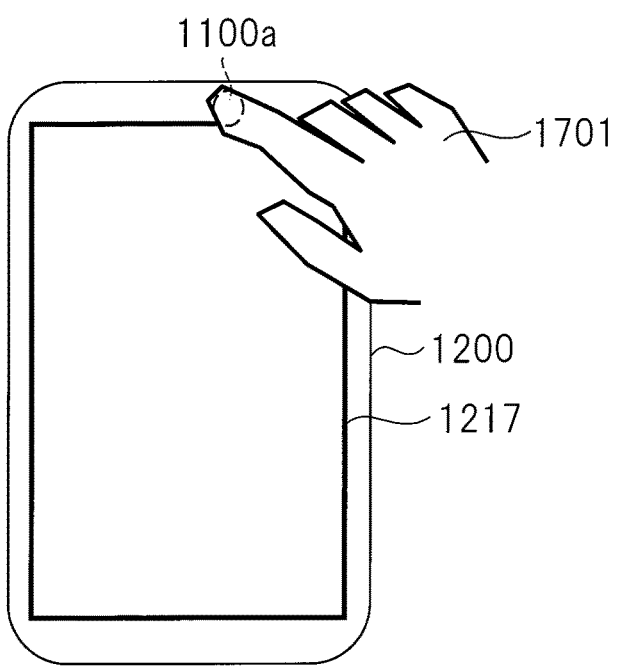
FIG. 19 is an explanatory diagram showing one example of a configuration of a mobile terminal according to a fourth embodiment.

FIG. 19 is an explanatory diagram showing one example of a configuration of a mobile terminal according to the present fourth embodiment.

A mobile terminal 1200 shown in FIG. 19 is configured so that the image-capturing apparatus 1100a is arranged above the display 1217 included in this mobile terminal 1200.

The image-capturing apparatus 1100a is provided with the non-visible light pixel 14 that is the IR pixel having the sensitivity to the near-infrared light in addition to the light forming the color image as shown in FIG. 1. Such a camera having the sensitivity to the near-infrared light is used for finger vein authentication or others.

It is assumed that, for example, the finger vein authentication is performed by using the non-visible light pixel 14 included in the image-capturing apparatus 1100a. The user's palm 1701 is brought close to the image-capturing apparatus 1100a, so that an image of a fingerprint of a finger surface can be captured as the color image. By using the non-visible light pixel, not the distance image but the finger vein image can be captured.

As described above, when the fingerprint and finger vein images are captured at the same time for the authentication, an effect of preventing impersonating using only the fingerprint image or others is caused.

Subsequently, other application examples will be described.

In recent years, an eyeglasses-type mobile terminal that is called MR (Mixed Reality) device has been researched and commercialized. The Internet information or others is three-dimensionally superimposed and displayed on a field of view of a user wearing eyeglasses, and besides, an operational menu or others is also superimposed and displayed on the field of view, and then, the user operates the menu or others as if the user touched it by his/her hand, so that the menu or others responds to the operation, and various operations can be performed. Application of the image-capturing apparatus 1100 to such a device is thought.

Fifth Embodiment

<Fifth Application Example>

Figure 20:
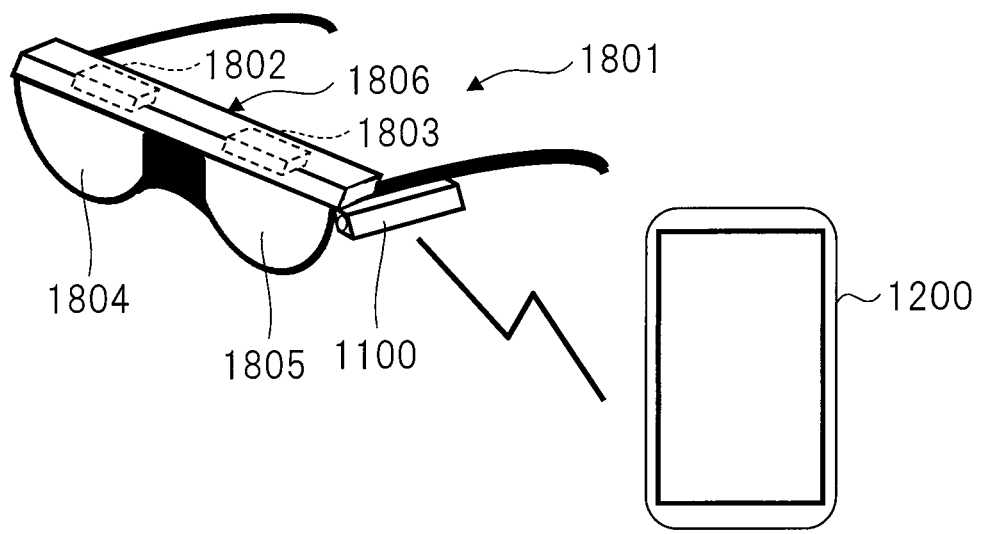
FIG. 20 is an explanatory diagram showing an application example of a mobile terminal according to a fifth embodiment.

FIG. 20 is an explanatory diagram showing an application example of a mobile terminal according to the present fifth embodiment.

In FIG. 20, a type of a mobile terminal 1801 is, for example, an eyeglasses type. The mobile terminal 1801 has a right transparent member 1804, a left transparent member 1805, a right display 1802, a left display 1803 and the image-capturing apparatus 1100.

The right transparent member 1804 and the left transparent member 1805 are arranged on portions corresponding to lenses of the eyeglasses. The right display 1802 and the left display 1803 are arranged above a frame 1803 of the eyeglasses. The image-capturing apparatus 1100 is arranged on one temple of the frame 1806.

Each of the right transparent member 1804 and the left transparent member 1805 is a coated transparent member that transmits the external light but reflects light from a surface through which the user views while wearing it. The right display 1802 and the left display 1803 project, for example, the menu for use in operating the mobile terminal 1801 onto the right transparent member 1804 and the left transparent member 1805, respectively.

The image-capturing apparatus 1100 is an image-capturing apparatus capable of capturing the color image and the distance image at the same time, and has the same configuration as that of FIG. 13, and therefore, the description thereof is omitted.

An image of motion in which the user holds his/her hand over and operates the menu projected by the right display 1802 and the left display 1803 is captured by the image-capturing apparatus 1100. Then, the operation on the mobile terminal 1801 is determined by analyzing the motion of the hand on the basis of the acquired color image and distance image, and an operational result is displayed through the right display 1802 and the left display 1803.

And, the mobile terminal 1801 can exchange the information with a different mobile terminal 1200. The communication for the information exchange is performed through, for example, BLUETOOTH (registered trademark).

<Configuration Example of Mobile Terminal>

Figure 21:
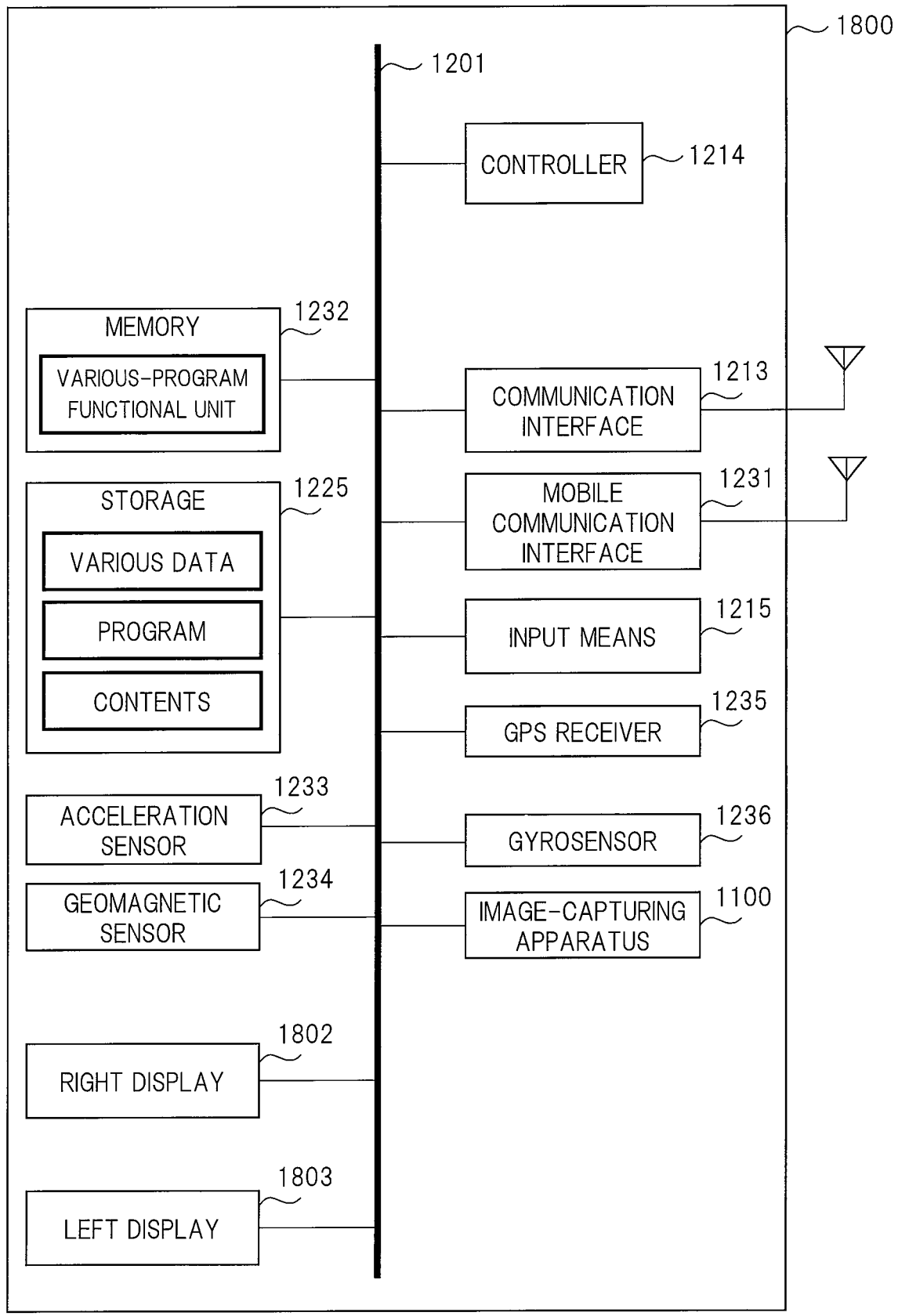
FIG. 21 is a block diagram showing one example of a configuration of the mobile terminal of FIG. 20.

FIG. 21 is a block diagram showing one example of a configuration of the mobile terminal of FIG. 20.

A functional configuration of the mobile terminal 1801 of FIG. 21 is different from that of the mobile terminal 1200 of FIG. 14 in that the right display 1802 and the left display 1803 are newly arranged but the tuner/demodulator 1222, the signal divider 1221, the display 1217, the switch input unit 1250 and the audio input/output unit 1260 are removed.

The right display 1802 and the left display 1803 are arranged above the frame 1806 of the eyeglasses-type mobile terminal 1801 of FIG. 20, and the operational menu is displayed on each of the right transparent member 1804 and the left transparent member 1805 as described above.

The image-capturing apparatus 1100 has the same configuration as that of FIG. 13 in which a menu operation described later is performed by three-dimensional capturing of the motion of the user's palm. Other connecting configurations are the same as those of FIG. 14, and therefore, the description thereof is omitted.

<Display Example of Menu>

Figure 22:
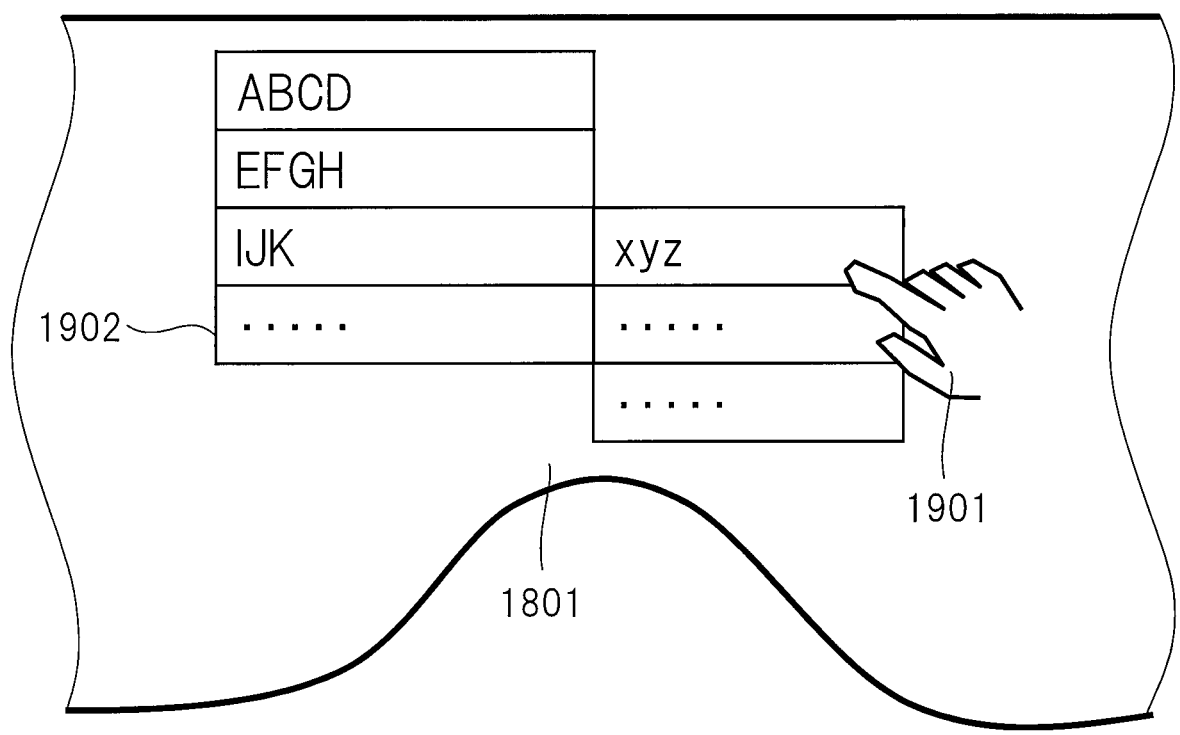
FIG. 22 is an explanatory diagram showing one example of a menu displayed when a user wears the mobile terminal of FIG. 20.

FIG. 22 is an explanatory diagram showing one example of a menu displayed when the user wears the mobile terminal of FIG. 20.

On the right transparent member 1804 and the left transparent member 1805, a menu 1902 is displayed so as to float in a virtual space.

The user operates the virtual menu 1902 by using a user's palm 1901. When an item to be selected among items of the menu 1902 is displayed as the color images, and when an execution instruction by which the selected item is executed is displayed so that the motion of the palm 1901 in the depth direction is determined on the basis of the distance image, a convenient mobile terminal 1801 can be provided.

As described above, even the eyeglasses-type mobile terminal without a margin for an attachment space can be downsized by using the image-capturing apparatus 1100 allowing one image-capturing device to acquire the color image and the distance image. In the manner, wear comfort of the eyeglasses-type mobile terminal 1801 can be improved.

<Application Example of Mobile Terminal>

Figure 23:
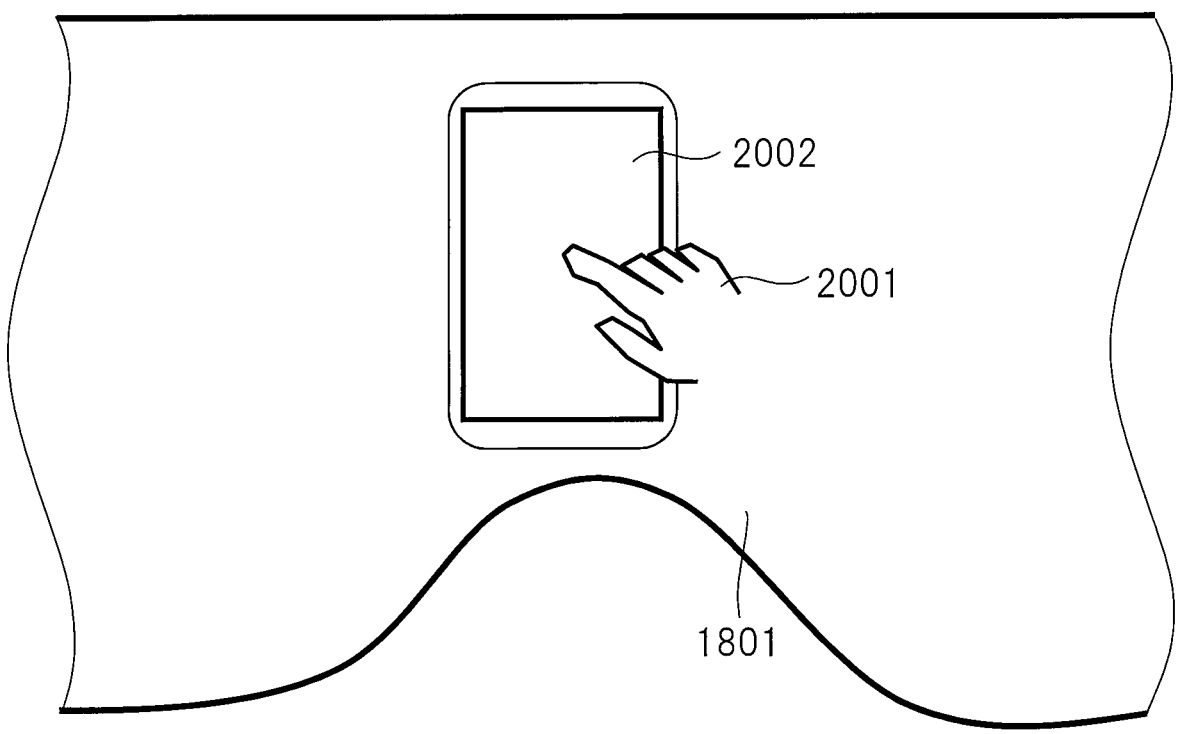
FIG. 23 is an explanatory diagram showing an application example of the mobile terminal of FIG. 20.

FIG. 23 is an explanatory diagram showing an application example of the mobile terminal of FIG. 20.

FIG. 23 shows a state viewed on the user's eyes through the mobile terminal 1801 when the user wears the eyeglasses-type mobile terminal 1801 as similar to FIG. 22.

A mobile terminal 2002 illustrated in FIG. 23 is a smartphone-type virtual mobile terminal projected on the eyeglasses-type mobile terminal 1801. The user operates an operational menu projected on the virtual mobile terminal 2002 by using his/her palm 2001.

In this manner, the motion of the palm 2001 is operated within a range of the virtual mobile terminal 2002, and therefore, this manner has a merit capable of reducing hitting of the hand during the operation against other people in a place where there are people around the user.

If it is set that the user is allowed to turn ON/OFF a mode in which the menu screen of the mobile terminal 1801 is selected and operated or a virtual terminal mode in which the virtual mobile terminal 2002 is displayed and operated, the setting is convenient.

Alternatively, when there are a lot of people near the communication among the terminals, the hitting of the hand during the operation against other people in the place where there are people around the user can be prevented by the control for the turning ON of the display mode of the virtual terminal or others, so that this manner is convenient for the user and the surrounding people.

Figure 24:
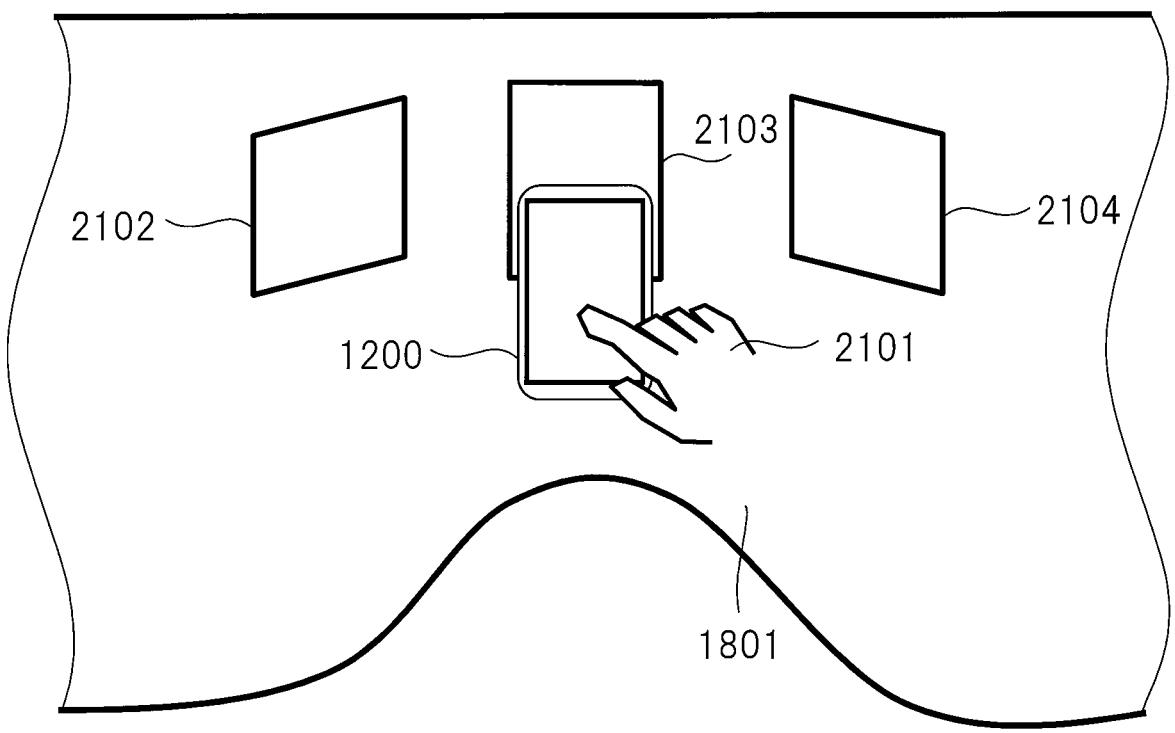
FIG. 24 is an explanatory diagram showing another application example of the mobile terminal of FIG. 23.

FIG. 24 is an explanatory diagram showing another application example of the mobile terminal of FIG. 23.

FIG. 24 also shows a state viewed on the user's eyes through the mobile terminal 1801 when the user wears the eyeglasses-type mobile terminal 1801 as similar to FIG. 23.

An operational menu 2102, an operational menu 2103 and an operational menu menu 2104 are displayed so that the user can view the operational menus from left to right as illustrated. The mobile terminal 1200 in front of the operational menu 2103 is a real mobile terminal, and has the same configuration as that of FIG. 14.

The image-capturing apparatus 1100 shown in FIG. 13 is mounted on the eyeglasses-type mobile terminal 1801 and the mobile terminal 1200. Therefore, both the mobile terminal 1801 and the mobile terminal 1200 can recognize information of surrounding spatial positions on the basis of the color image and the distance image, and therefore, a relative position between the mobile terminal 1801 and the mobile terminal 1200 can be recognized.

As illustrated, when the mobile terminal 1200 is held over the operational menu 2103 displayed on the mobile terminal 1801, this mobile terminal 1200 becomes an operational terminal for the menu 2103. Similarly, when the mobile terminal 1200 is held over the operational menu 2102, the operation for the selection in the menu 2102 or others can be performed on the mobile terminal 1200. When the mobile terminal 1200 is held over the operational menu 2104, the operation for the selection in the menu 2104 or others can be performed on the mobile terminal 1200.

In the manner, action itself for the selection in the menu can be manipulated by tapping on the screen of the real mobile terminal 1200. As a result, a tangible entity can be operated, and therefore, a sense of ease can be provided to the user.

On the basis of a relative positional relation between the menus 2102 to 2104 displayed on the mobile terminal 1801 and the mobile terminal 1200 for use in the operation, when the mobile terminal 1200 exists in front of each of the virtually-displayed menus 2102 to 2104, if the color image of the mobile terminal is displayed so as to overlap the menu that is deeper, there is a merit that the user is easy to operate the mobile terminal 1200.

Sixth Embodiment

<Application Example>

In the present sixth embodiment, an application example to a field of three-dimensional measurement will be described.

Figure 25:
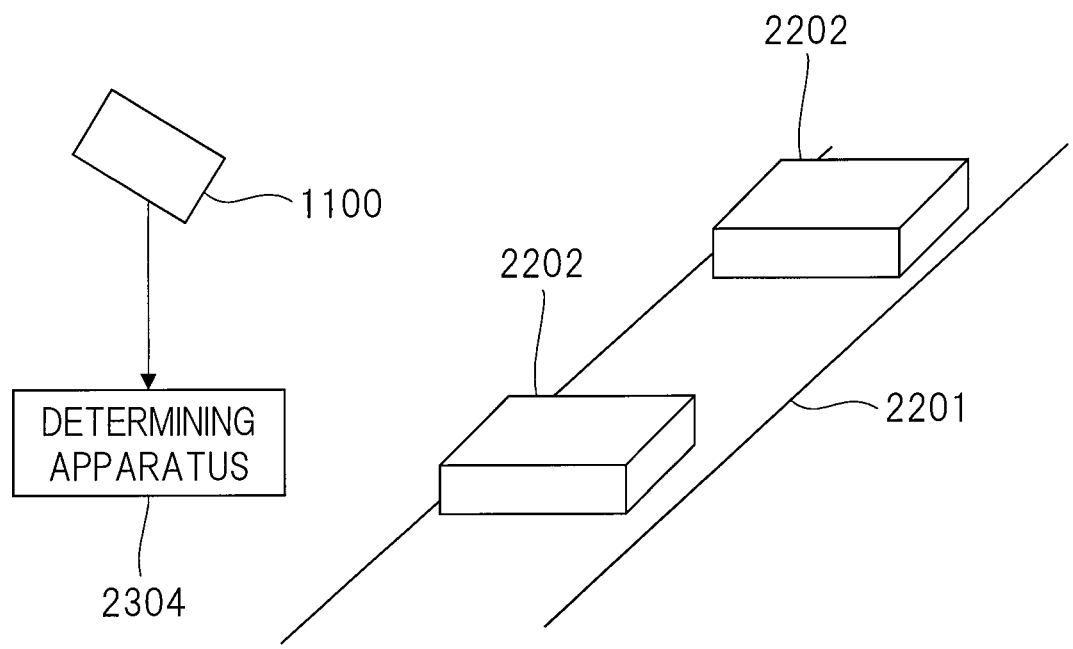
FIG. 25 is an explanatory diagram showing an application example of an image-capturing apparatus according to a sixth embodiment.

FIG. 25 is an explanatory diagram showing an application example of an image-capturing apparatus according to the present sixth embodiment.

FIG. 25 shows a technique of, for example, determining a product shape in a factory or others. In the factory or others, a conveyor belt 2101 is placed, and a manufactured product 2202 is carried by the conveyor belt.

The image-capturing apparatus 1100 is arranged above the conveyor belt 2101, and a determining apparatus 2304 made of, for example, a personal computer or others is connected to the image-capturing apparatus. In this case, a configuration of the image-capturing apparatus 1100 is the same as that of FIG. 13.

The image-capturing apparatus 1100 acquires a color image and a distance image of the product 2202. Note that the color image may be a black-and-white image if needed.

The determining apparatus 2304 determines that the product 2202 that is carried by the conveyor belt 2101 is either a non-defective product or a defective product. In the determination for the non-defective/defective product, a three-dimensional shape of the product 2202 is determined on the basis of the color image and the distance image captured by the image-capturing apparatus 1100.

In this case, even if a carrying speed of the conveyor belt 2201 is large, the image-capturing apparatus 1100 can acquire the color image and the distance image at the same frame timing, and therefore, the frame rate for the image capturing can be increased. As a result, even if the carrying speed of the conveyor belt 2201 is large, the determination for the non-defective/defective product 2202 can be stably performed.

In the manner, since the carrying speed of the conveyor belt 2201 can be made large, a productive efficiency of the product 2202 can be increased.

The image-capturing apparatus 1100 is more advantageous in not only the frame rate but also a cost than an image-capturing apparatus separately using the image-capturing device for the distance image and the image-capturing device for the color image.

Figure 26:
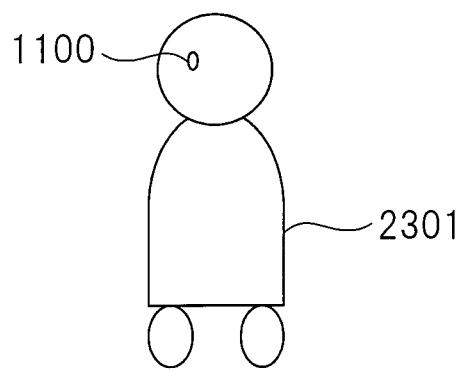
FIG. 26 is an explanatory diagram showing another application example of the image-capturing apparatus of FIG. 25.

FIG. 26 is an explanatory diagram showing another application example of the image-capturing apparatus of FIG. 25.

FIG. 26 shows an example of application of the image-capturing apparatus 1100 to an autonomous mobile robot 2301. The image-capturing apparatus 1100 is arranged as an eye of the robot 2301, and captures the color image and the distance image therein.

The robot 2301 has a not-illustrated control apparatus. A three-dimensional image is created by this control apparatus, and front obstacle and person are recognized by using data of the image. Also in such a case, the frame rate for the image capturing can be made larger than the case using the image-capturing device that alternately captures the color image and the distance image therein.

And, this image-capturing apparatus is also more advantageous in a cost than the image-capturing apparatus separately using the image-capturing device for the distance image and the image-capturing device for the color image.

When the image-capturing device 10 of FIG. 2 is used for a laparoscope or others that needs downsizing of the image-capturing unit, the distance image and the color image can be captured by one image-capturing device, and therefore, a laparoscope also capable of checking a size of an affected part or others can be provided.

Note that the above-described embodiments are not limited to be independently applied. For example, in the example shown in FIG. 24, when the mobile terminal 1200 of FIG. 14 is held over a position that is farther than the virtual position of the operational menu 2103, the mobile terminal 1200 is displayed so as to be deeper than the operational menu 2103.

And, when the mobile terminal 1200 is held over a position that is closer than the virtual position of the operational menu 2103, the mobile terminal 1200 is displayed so as to be more front than the operational menu 2103, so that a more convenient favorable mobile terminal can be provided. As described above, in combination of the embodiment examples, the embodiments can be freely combined.

Also, a part of the structure of one embodiment can be replaced with the structure of another embodiment, and besides, the structure of another embodiment can be added to the structure of one embodiment. Further, another structure can be added to/eliminated from/replaced with a part of the structure of each embodiment.

Each of the above-described structures may be achieved by causing a processor to execute a program even when each of some or all the structures is made of hardware. Also, control lines and information lines that are necessary for the explanation are illustrated, and all the control lines and information lines for the product are not always illustrated. It may be thought that almost all the structures are practically connected to one another.

<Statement>

In addition, some of the contents described in the embodiments will be described below.

(1) In a mobile terminal having an image-capturing apparatus that captures images, the image-capturing apparatus includes: an optical lens that introduces an optical image therein; an image-capturing device that acquires image data from the optical image introduced by the optical lens; a light source that emits near-infrared light; and a controller that controls the light emission of the light source and an operation of the image-capturing device, the image-capturing device includes: a sensor configured to have a plurality of visible light pixels having sensitivity to visible light and a plurality of non-visible light pixels having sensitivity to non-visible light; a visible-light-pixel driver that controls light exposure to the visible light pixels and a reading operation for charges generated by photoelectric conversion of the visible light pixels resulting from the light exposure; and a non-visible-light-pixel driver that controls light exposure to the non-visible light pixels and a reading operation for charges generated by photoelectric conversion of the non-visible light pixels resulting from the light exposure, the non-visible-light-pixel driver performs the light exposure to previously-set every two or more non-visible light pixels at the time of the light exposure to the non-visible light pixels and the reading operation, and sums and reads the charges generated by the photoelectric conversion of the two or more non-visible light pixels resulting from the light exposure, and the controller controls the light source to emit the near-infrared light at the time of the light exposure to the two or more non-visible light pixels.

(2) In the mobile terminal described in (1), the non-visible-light-pixel driver performs the control so that at least a part of a first light-exposure duration in which the light exposure to the two or more non-visible light pixels is performed overlaps a second light-exposure duration in which the light exposure to the visible light pixels is performed.

(3) In the mobile terminal described in (2), the non-visible-light-pixel driver includes: a first switch that introduces the charges therein generated by the photoelectric conversion of the two or more non-visible light pixels; a first capacity that accumulates the charges introduced by the switch for every two or more non-visible light pixels and to convert the charges into voltages; an amplifier that amplifies each of the voltages converted by the first capacity; and a timing controller that controls a timing of the light exposure to the two or more non-visible light pixels and an operation of the first switch, the timing controller controls the first switch so that the photoelectrically-converted charges are accumulated in the first capacity for every non-visible light pixel, and light is sequentially exposed to the two or more non-visible light pixels at the time of the light exposure to the two or more non-visible light pixels so that the light-exposure durations do not overlap each other.

(4) In the mobile terminal described in (2), the non-visible-light-pixel driver includes a second switch that reads the charges generated by the photoelectric conversion of the plurality of non-visible light pixels provided in the sensor, and the timing controller controls the second switch selecting the two or more non-visible light pixels, the charges of which are summed at the time of the light exposure and the reading operation.

(5) In the mobile terminal described in (4), on the basis of a first control command input from outside, the timing controller controls the second switch so as to change the number of non-visible light pixels, the charges of which are summed.

(6) In the mobile terminal described in (3), the non-visible-light-pixel driver includes a distance-image calculator that calculates the output voltages from the amplifier and generates and outputs a distance image, and the timing controller performs the control so that a calculation timing at which the distance-image calculator calculates the voltages is 1/N of a timing of the frame rate.

(7) In the mobile terminal described in (6), on the basis of a second control command input from outside, the timing controller controls the calculation timing of the calculation in the distance-image calculator.

EXPLANATION OF REFERENCE CHARACTERS

10 image-capturing device
11 visible light pixel
14 non-visible light pixel
210 visible-light-pixel driver
214 controller
220 non-visible-light-pixel driver
230 output interface
321 to 323 switch 331 to 333 capacity device
341 to 343 switch
351 amplifier
352 visible-light timing generator
353 image-data generator
361 switch
362 switch
371 capacity device
372 capacity device
381 to 384 amplifier
382 non-visible-light timing generator
385 non-visible-light timing generator
386 distance-data calculation generator
391 to 394 switch
1100 image-capturing apparatus
1101 optical lens
1103 IR light source
1104 camera controller
1200 mobile terminal
1213 communication interface
1214 controller
1215 button
217 display
1221 signal divider
1222 tuner/demodulator
1225 storage
1231 mobile communication interface
1232 memory
1233 acceleration sensor
1234 geomagnetic sensor
1235 GPS receiver
1236 gyrosensor
1250 switch input unit
1260 audio input/output unit
1261 microphone
1262 speaker
1802 right display

The invention claimed is:

1. An image-capturing device comprising:
a sensor configured to have a plurality of visible light pixels having sensitivity to visible light and a plurality of non-visible light pixels having sensitivity to non-visible light;
a non-visible-light-pixel driving circuit configured to control first light exposure to the non-visible light pixels, to perform a first reading operation to read charges generated by photoelectric conversion of the non-visible light pixels resulting from the first light exposure, and to create a distance image; and
a visible-light-pixel driving circuit configured to control second light exposure to the visible light pixels, to perform a second reading operation to read charges generated by photoelectric conversion of the visible light pixels resulting from the second light exposure, and to create a visible light image,
wherein the non-visible-light-pixel driving circuit:
performs the first light exposure to previously set every two or more non-visible light pixels,
performs control so that at least a part of a first light-exposure duration in which the first light exposure to the two or more non-visible light pixels is performed overlaps a second light-exposure duration in which the second light exposure to the visible light pixels is performed at the time of the first light exposure,
sums charges generated by the photoelectric conversion of the two or more non-visible light pixels resulting from the first light exposure,
reads the summed charges in the first reading operation, and
creates the distance image on the basis of the summed charges.

2. The image-capturing device according to claim 1, wherein
the non-visible-light-pixel driving circuit includes a first timing generator configured to generate a first control signal indicating a timing of the first reading operation,
the visible-light-pixel driving circuit includes a second timing generator configured to generate a second control signal indicating a timing of the second reading operation,
the first timing generator is configured to receive the second control signal generated by the second timing generator and generate the first control signal, and
the summed charges are read at a timing based on the first control signal generated by the first timing generator in the first reading operation.

3. The image-capturing device according to claim 2, wherein the non-visible-light-pixel driving circuit includes:
a first switch configured to introduce the charges therein generated by the photoelectric conversion of the two or more non-visible light pixels;
a first capacity configured to accumulate the charges introduced by the first switch for the every two or more non-visible light pixels and to convert the charges into voltages; and
an amplifier configured to amplify each of the voltages converted by the first capacity, and
wherein the first switch is controlled based on a signal from the first timing generator so that the photoelectrically-converted charges are accumulated in the first capacity for every non-visible light pixel.

4. The image-capturing device according to claim 3, wherein the non-visible-light-pixel driving circuit includes a second switch configured to read the charges generated by the photoelectric conversion of the plurality of non-visible light pixels provided in the sensor, and
the second switch is controlled to select the two or more non-visible light pixels based on a signal from the first timing generator.

5. The image-capturing device according to claim 4, wherein, on the basis of a first control command input from outside, the non-visible-light-pixel driving circuit controls the second switch so as to change the number of the non-visible light pixels, the charges of which are summed.

6. The image-capturing device according to claim 3, wherein the non-visible-light-pixel driving circuit includes a distance-image calculating circuit configured to calculate the output voltages from the amplifier and create and output the distance image, and
the distance-image calculating circuit is controlled so that a calculation timing of the voltages is 1/N of a timing of a frame rate.

7. The image-capturing device according to claim 6, wherein, on the basis of a second control command input from outside, the non-visible-light-pixel driving circuit controls the calculation timing.

8. The image-capturing device according to claim 1, wherein
at the time of the first light exposure, light is sequentially exposed to the two or more non-visible light pixels so that light-exposure durations of the two or more non-visible light pixels do not overlap each other.

9. An image-capturing apparatus comprising:
an optical lens configured to introduce an optical image therein;
an image-capturing device configured to acquire image data from the optical image introduced by the optical lens;
a light source configured to emit near-infrared light; and
a controller configured to control the light emission of the light source and an operation of the image-capturing device,
wherein the image-capturing device includes:
   a sensor configured to have a plurality of visible light pixels having sensitivity to visible light and a plurality of non-visible light pixels having sensitivity to non-visible light;
   a non-visible-light-pixel driving circuit configured to control first light exposure to the non-visible light pixels, to perform a first reading operation to read charges generated by photoelectric conversion of the non-visible light pixels resulting from the first light exposure, and to create a distance image; and
   a visible-light-pixel driving circuit configured to control second light exposure to the visible light pixels, to perform a second reading operation to read charges generated by photoelectric conversion of the visible light pixels resulting from the second light exposure, and to create a visible light image,
the non-visible-light-pixel driving circuit
   performs the first light exposure to two or more non-visible light pixels,
   performs control so that at least a part of a first light-exposure duration in which the first light exposure to the two or more non-visible light pixels is performed overlaps a second light-exposure duration in which the second light exposure to the visible light pixels is performed at the time of the first light exposure,
   sums the charges generated by the photoelectric conversion of the two or more non-visible light pixels resulting from the first light exposure, and
   reads the summed charges in the first reading operation, and
the controller controls the light source to emit the near-infrared light at the time of the second light exposure to the two or more non-visible light pixels.

10. The image-capturing apparatus according to claim 9, wherein
the non-visible-light-pixel driving circuit includes a first timing generator configured to generate a first control signal indicating a timing of the first reading operation,
the visible-light-pixel driving circuit includes a second timing generator configured to generate a second control signal indicating a timing of the second reading operation,
the first timing generator is configured to receive the second control signal generated by the second timing generator and generate the first control signal, and
the summed charges are read at a timing based on the first control signal generated by the first timing generator in the first reading operation.

11. The image-capturing apparatus according to claim 10, wherein the non-visible-light-pixel driving circuit includes:

a first switch configured to introduce the charges therein generated by the photoelectric conversion of the two or more non-visible light pixels;
a first capacity configured to accumulate the charges introduced by the first switch for the every two or more non-visible light pixels and to convert the charges into voltages; and
an amplifier configured to amplify each of the voltages converted by the first capacity, and
wherein the first switch is controlled based on a signal from the first timing generator so that the photoelectrically-converted charges are accumulated in the first capacity for every non-visible light pixel.

12. The image-capturing apparatus according to claim 11, wherein the non-visible-light-pixel driving circuit includes a second switch configured to read the charges generated by the photoelectric conversion of the plurality of non-visible light pixels provided in the sensor, and
the second switch is controlled to select the two or more non-visible light pixels based on the signal from the first timing generator.

13. The image-capturing apparatus according to claim 12, wherein, on the basis of a first control command input from outside, the non-visible-light-pixel driving circuit controls the second switch so as to change the number of the non-visible light pixels, the charges of which are summed.

14. The image-capturing apparatus according to claim 11, wherein the non-visible-light-pixel driving circuit includes a distance-image calculating circuit configured to calculate the output voltages from the amplifier and create and output the distance image, and
the distance-image calculating circuit is controlled so that a calculation timing of the voltages is 1/N of a timing of a frame rate.

15. The image-capturing apparatus according to claim 14, wherein, on the basis of a second control command input from outside, the non-visible-light-pixel driving circuit controls the calculation timing.

16. The image-capturing apparatus according to claim 9, wherein at the time of the first light exposure, light is sequentially exposed to the two or more non-visible light pixels so that light-exposure durations of the two or more non-visible light pixels do not overlap each other.

17. A method of acquiring a distance image by using an image-capturing device including a sensor configured to have a plurality of visible light pixels having sensitivity to visible light and a plurality of non-visible light pixels having sensitivity to non-visible light, comprising the steps of:
performing light exposure to the visible light pixels with a visible-light-pixel driving circuit;
performing light exposure to two or more non-visible light pixels with a non-visible-light-pixel driving circuit;
performing control so that at least a part of a first light-exposure duration in which the light exposure to the two or more non-visible light pixels is performed overlaps a second light-exposure duration in which the light exposure to the visible light pixels is performed at the time of the light exposure to the two or more non-visible light pixels;
summing charges generated by photoelectric conversion of the two or more non-visible light pixels resulting from the light exposure to the two or more non-visible light pixels;

reading the summed charges; and creating the distance image on the basis of the summed charges.

18. The method of acquiring the distance image according to claim 17, wherein, in the step of performing the light exposure, light is sequentially exposed to the two or more non-visible light pixels so that the light-exposure durations to two or more non-visible light pixels do not overlap each other.

19. The method of acquiring the distance image according to claim 17, wherein the non-visible-light-pixel driving circuit includes a first timing generator configured to generate a first control signal indicating a timing of the first reading operation, the visible-light-pixel driving circuit includes a second timing generator configured to generate a second control signal indicating a timing of the second reading operation, the first timing generator is configured to receive the second control signal generated by the second timing generator and generate the first control signal, and the summed charges are read at a timing based on the first control signal generated by the first timing generator in the first reading operation.

* * * * *